United States Patent
Shrestha et al.

(10) Patent No.: US 12,170,887 B2
(45) Date of Patent: Dec. 17, 2024

(54) NEIGHBOR CELL LIST MANAGEMENT IN NON-TERRESTRIAL NETWORKS

(71) Applicant: QUALCOMM Incorporated, San Diego, CA (US)

(72) Inventors: Bharat Shrestha, San Diego, CA (US); Mungal Singh Dhanda, Slough (GB); Umesh Phuyal, San Diego, CA (US); Prasad Reddy Kadiri, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 246 days.

(21) Appl. No.: 17/450,797

(22) Filed: Oct. 13, 2021

(65) Prior Publication Data

US 2022/0132383 A1 Apr. 28, 2022

Related U.S. Application Data

(60) Provisional application No. 63/198,492, filed on Oct. 22, 2020.

(51) Int. Cl.
*H04W 36/00* (2009.01)
*H04W 84/06* (2009.01)

(52) U.S. Cl.
CPC ........ *H04W 36/0061* (2013.01); *H04W 84/06* (2013.01)

(58) Field of Classification Search
CPC ... H04W 36/08; H04W 36/24; H04W 36/304; H04W 36/00835; H04W 36/0061
See application file for complete search history.

(56) References Cited

U.S. PATENT DOCUMENTS

2012/0014267 A1* 1/2012 Gomes ................. H04W 36/305
370/252
2012/0315890 A1* 12/2012 Suzuki .................. H04W 24/10
455/422.1

(Continued)

FOREIGN PATENT DOCUMENTS

EP 2611239 A2 7/2013
WO WO-2013028128 A1 * 2/2013 ........ H04W 36/0094

(Continued)

OTHER PUBLICATIONS

3GPP TR 38.821: "3rd Generation Partnership Project, Technical Specification Group Radio Access Network, Solutions for NR to Support Non-Terrestrial Networks (NTN) (Release16)", 3GPP Standard, Technical Report, 3rd Generation Partnership Project (3GPP), Mobile Competence Centre, 650, Route Des Lucioles, F-06921 Sophia-Antipolis Cedex, France, vol. RAN WG3, No. V16.0.0 (Dec. 2019), Jan. 16, 2020 (Jan. 16, 2020), XP051860814, pp. 1-140, Retrieved from the Internet: URL: http://ftp.3gpp.org/Specs/archive/38_series/38.821/38821-g00.zip 38821-g00.doc [Retrieved on Jan. 16, 2020] Paragraphs [04.1], [6.3.4], [07.3], [09.2], Para. 7.3. 1.1-7.3. 1.2, 7.3.1.3.2, Para.8.1-8.2.2.2, p. 63, Paragraph 6.2.4 p. 82, Paragraph 7.2.1.2.1-p. 83, Paragraph 7.2.1.2.1, p. 89, Paragraph 7.3-p. 93, Paragraph 7.3.1.7, Section 1, Section 5, Section: 7.2.1.1, p. 38, Option 2, Section 6.2.3, Section 6.2.4, abstract sections 7.3.1 and 7.3.2.

(Continued)

*Primary Examiner* — Shukri Taha
(74) *Attorney, Agent, or Firm* — Harrity & Harrity, LLP

(57) ABSTRACT

Various aspects of the present disclosure generally relate to wireless communication. In some aspects, a user equipment (UE) may receive a neighbor cell list that indicates at least one neighbor cell. The UE may perform a cell selection procedure or a cell reselection procedure to switch to a (Continued)

serving cell without receiving an updated neighbor cell list from the serving cell. Numerous other aspects are provided.

30 Claims, 12 Drawing Sheets

(56) References Cited

U.S. PATENT DOCUMENTS

| | | | | | |
|---|---|---|---|---|---|
| 2013/0244654 | A1* | 9/2013 | Carmon | ................ | H04W 36/32 |
| | | | | | 455/436 |
| 2014/0071939 | A1* | 3/2014 | Yang | ..................... | H04W 48/20 |
| | | | | | 370/331 |
| 2016/0066252 | A1* | 3/2016 | Parron | ................. | H04W 48/16 |
| | | | | | 455/434 |
| 2021/0068013 | A1* | 3/2021 | Cheng | .............. | H04W 36/0072 |
| 2022/0109496 | A1* | 4/2022 | Shrestha | ............ | H04B 7/18541 |

FOREIGN PATENT DOCUMENTS

| | | | | |
|---|---|---|---|---|
| WO | WO-2018052744 | A2 | 3/2018 | |
| WO | WO-2020231123 | A1 * | 11/2020 | ........ H04W 36/0058 |
| WO | WO-2021056468 | A1 * | 4/2021 | ........ H04W 36/0005 |

OTHER PUBLICATIONS

International Search Report and Written Opinion—PCT/US2021/071880—ISA/EPO—Apr. 21, 2022.
Partial International Search Report—PCT/US2021/071880—ISA/EPO—Feb. 24, 2022.
Qualcomm Inc: "Idle Mode Procedure", 3GPP Draft, R2-2006973, 3GPP TSG-RAN WG2 Meeting #111e, 3rd Generation Partnership Project (3GPP), Mobile Competence Centre, 650, Route Des Lucioles, F-06921 Sophia-Antipolis Cedex, France, vol. RAN WG2, No. E-Meeting, Aug. 17-Aug. 28, 2020, Aug. 7, 2020 (Aug. 7, 2020), XP051911821, 4 Pages, Retrieved from the Internet: URL:https://ftp.3gpp.org/tsg_ran/WG2_RL2/TSGR2_111-e/Docs/R2-2006973.zip R2-2006973.docx [retrieved on Aug. 7, 2020] the whole document.
Samsung: "Control Plane Enhancements for Idle and Inactive Modes in an NTN—Overall Observations and Proposals", 3GPP Draft, R2-2006945, 3GPP TSG RAN WG2 Meeting #111, 3rd Generation Partnership Project (3GPP), Mobile Competence Centre, 650, Route Des Lucioles, F-06921 Sophia-Antipolis Cedex, France, vol. RAN WG2, No. e-Meeting, Aug. 17-Aug. 28, 2020, Aug. 6, 2020 (Aug. 6, 2020), XP051910889, 5 Pages, Retrieved from the Internet: URL:https://ftp.3gpp.org/tsg_ran/WG2_RL2/TSGR2_111-e/Docs/R2-2006945.zip R2-2006945_For8.10.3.1_CP_IdleinactiveMode_ObservationsProposals_Samsung.doc [retrieved on Aug. 6, 2020] the whole document.

* cited by examiner

NEIGHBOR CELL LIST MANAGEMENT IN NON-TERRESTRIAL NETWORKS

CROSS-REFERENCE TO RELATED APPLICATION

This patent application claims priority to U.S. Provisional Patent Application No. 63/198,492, filed on Oct. 22, 2020, entitled "NEIGHBOR CELL LIST MANAGEMENT IN NON-TERRESTRIAL NETWORKS," and assigned to the assignee hereof. The disclosure of the prior application is considered part of and is incorporated by reference into this patent application.

INTRODUCTION

Aspects of the present disclosure generally relate to wireless communication and to techniques and apparatuses for neighbor cell list management in non-terrestrial networks.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication performed by a user equipment (UE) includes receiving a neighbor cell list that indicates at least one neighbor cell; performing a cell selection procedure or a cell reselection procedure; and switching to a serving cell without receiving an updated neighbor cell list from the serving cell.

In some aspects, a method of wireless communication performed by a UE includes determining that a serving cell visibility duration of a serving cell satisfies a first threshold; determining that a new cell visibility duration of a new cell satisfies a second threshold; and performing a cell reselection procedure to switch from the serving cell to the new cell based at least in part on determining that the first threshold is satisfied and the second threshold is satisfied.

In some aspects, a method of wireless communication performed by a UE includes determining that a cell type of a candidate cell satisfies a reselection priority condition; and performing a cell reselection procedure to switch from a serving cell to the candidate cell based at least in part on determining that the cell type of the candidate cell satisfies the reselection priority condition.

In some aspects, a UE for wireless communication includes a memory and one or more processors coupled to the memory, the one or more processors configured to: receive a neighbor cell list that indicates at least one neighbor cell; perform a cell selection procedure or a cell reselection procedure; and switch to a serving cell without receiving an updated neighbor cell list from the serving cell.

In some aspects, a UE for wireless communication includes a memory and one or more processors coupled to the memory, the one or more processors configured to: determine that a serving cell visibility duration satisfies a first threshold; determine that a new cell visibility duration satisfies a second threshold; and perform a cell reselection procedure to switch from the serving cell to the new cell based at least in part on determining that the first threshold is satisfied and the second threshold is satisfied.

In some aspects, a UE for wireless communication includes a memory and one or more processors coupled to the memory, the one or more processors configured to: determine that a cell type of a candidate cell satisfies a reselection priority condition; and perform a cell reselection procedure to switch from a serving cell to the candidate cell based at least in part on determining that the cell type of the candidate cell satisfies the reselection priority condition.

In some aspects, a non-transitory computer-readable medium storing a set of instructions for wireless communication includes one or more instructions that, when executed by one or more processors of a UE, cause the UE to: receive a neighbor cell list that indicates at least one neighbor cell; perform a cell selection procedure or a cell reselection procedure; and switch to a serving cell without receiving an updated neighbor cell list from the serving cell.

In some aspects, a non-transitory computer-readable medium storing a set of instructions for wireless communication includes one or more instructions that, when executed by one or more processors of an UE, cause the UE to: determine that a serving cell visibility duration satisfies a first threshold; determine that a new cell visibility duration satisfies a second threshold; and perform a cell reselection procedure to switch from the serving cell to the new cell based at least in part on determining that the first threshold is satisfied and the second threshold is satisfied.

In some aspects, a non-transitory computer-readable medium storing a set of instructions for wireless communication includes one or more instructions that, when executed by one or more processors of a UE, cause the UE to: determine that a cell type of a candidate cell satisfies a reselection priority condition; and perform a cell reselection procedure to switch from a serving cell to the candidate cell based at least in part on determining that the cell type of the candidate cell satisfies the reselection priority condition.

In some aspects, an apparatus for wireless communication includes means for receiving a neighbor cell list that indicates at least one neighbor cell; means for performing a cell selection procedure or a cell reselection procedure; and means for switching to a serving cell without receiving an updated neighbor cell list from the serving cell.

In some aspects, an apparatus for wireless communication includes means for determining that a serving cell visibility duration satisfies a first threshold; means for determining that a new cell visibility duration satisfies a second threshold; and means for performing a cell reselection procedure to switch from the serving cell to the new cell based at least in part on determining that the first threshold is satisfied and the second threshold is satisfied.

In some aspects, an apparatus for wireless communication includes means for determining that a cell type of a candidate cell satisfies a reselection priority condition; and means for performing a cell reselection procedure to switch from a serving cell to the candidate cell based at least in part on determining that the cell type of the candidate cell satisfies the reselection priority condition.

Aspects generally include a method, apparatus, system, computer program product, non-transitory computer-readable medium, user equipment, base station, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
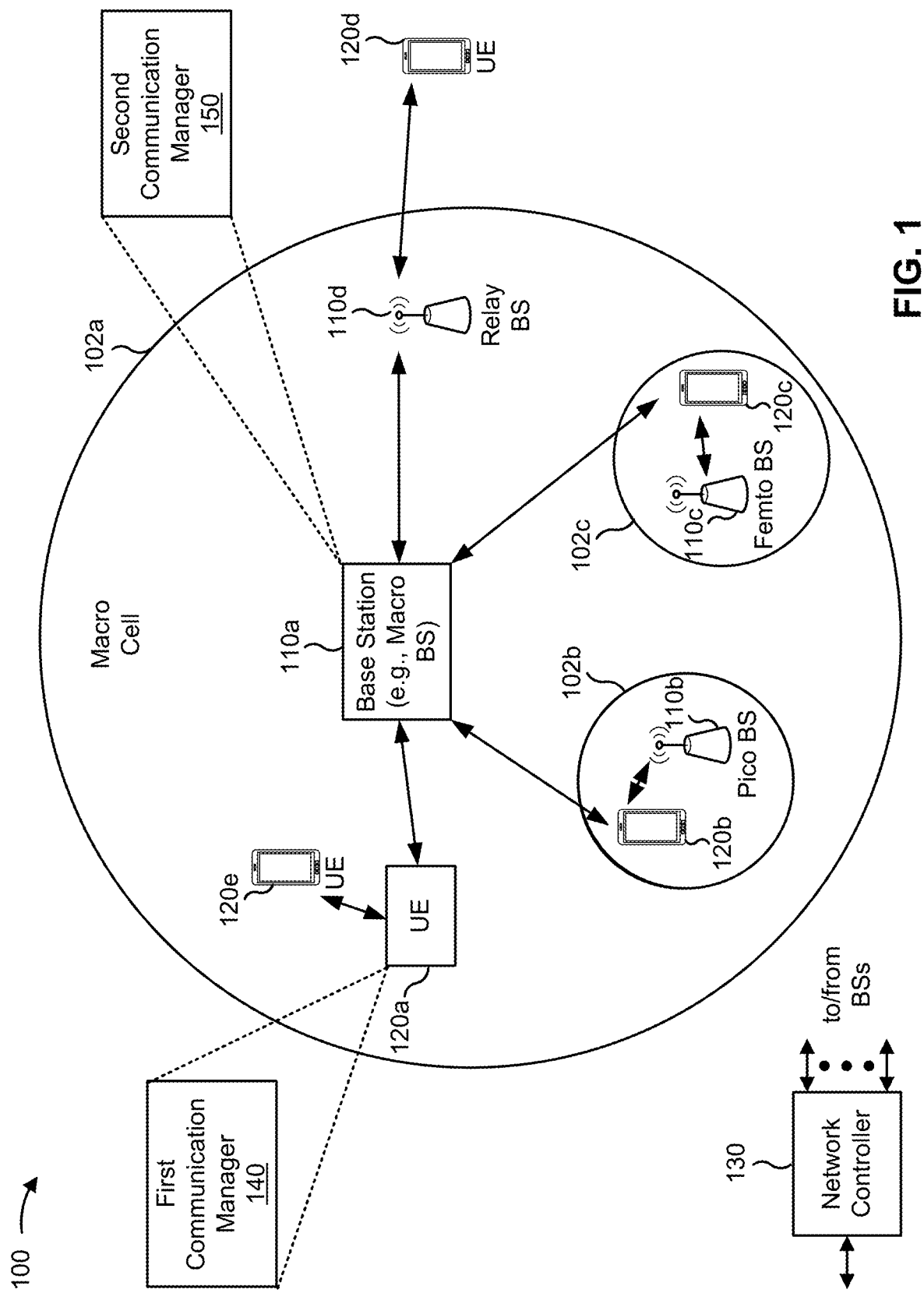
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

In some aspects, the wireless network 100 may include one or more non-terrestrial network (NTN) deployments in which a non-terrestrial wireless communication device may include a UE (referred to herein, interchangeably, as a "non-terrestrial UE"), a BS (referred to herein, interchangeably, as a "non-terrestrial BS" and "non-terrestrial base station"), and/or a relay station (referred to herein, interchangeably, as a "non-terrestrial relay station"), among other examples. As used herein, "NTN" may refer to a network for which access is facilitated by a non-terrestrial UE, non-terrestrial BS, and/or a non-terrestrial relay station, among other examples.

The wireless network 100 may include any number of non-terrestrial wireless communication devices. A non-terrestrial wireless communication device may include a satellite, a manned aircraft system, and/or an unmanned aircraft system (UAS) platform, among other examples. A satellite may include a low-earth orbit (LEO) satellite, a medium-earth orbit (MEO) satellite, a geostationary earth orbit (GEO) satellite, and/or a high elliptical orbit (HEO) satellite, among other examples. A manned aircraft system may include an airplane, helicopter, and/or a dirigible, among other examples. A UAS platform may include a high-altitude platform station (HAPS), and may include a balloon, a dirigible, and/or an airplane, among other examples. A non-terrestrial wireless communication device may be part of an NTN that is separate from the wireless network 100. Alternatively, an NTN may be part of the wireless network 100. Satellites may communicate directly and/or indirectly with other entities in wireless network 100 using satellite communication. The other entities may include UEs (e.g., terrestrial UEs and/or non-terrestrial UEs), other satellites in the one or more NTN deployments, other types of BSs (e.g., stationary and/or ground-based BSs), relay stations, and/or one or more components and/or devices included in a core network of wireless network 100, among other examples.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul. For example, in some aspects, the wireless network 100 may be, include, or be included in a wireless backhaul network, sometimes referred to as an integrated access and backhaul (IAB) network. In an IAB network, at least one base station (e.g., base station 110) may be an anchor base station that communicates with a core network via a wired backhaul link, such as a fiber connection. An anchor base station may also be referred to as an IAB donor (or IAB-donor), a central entity, and/or a central unit, among other examples. An IAB network may include one or more non-anchor base stations, sometimes referred to as relay base stations, IAB nodes (or IAB-nodes). The non-anchor base station may communicate directly with or indirectly with (e.g., via one or more non-anchor base stations) the anchor base station via one or more backhaul links to form a backhaul path to the core network for carrying backhaul traffic. Backhaul links may be wireless links. Anchor base station(s) and/or non-anchor base station(s) may communicate with one or more UEs (e.g., UE 120) via access links, which may be wireless links for carrying access traffic.

In some aspects, a radio access network that includes an IAB network may utilize millimeter wave technology and/or directional communications (e.g., beamforming and/or precoding, among other examples) for communications between base stations and/or UEs (e.g., between two base stations, between two UEs, and/or between a base station and a UE). For example, wireless backhaul links between base stations may use millimeter waves to carry information and/or may be directed toward a target base station using beamforming and/or precoding, among other examples. Similarly, wireless access links between a UE and a base station may use millimeter waves and/or may be directed toward a target wireless node (e.g., a UE and/or a base station). In this way, inter-link interference may be reduced.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In some aspects, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As shown in FIG. 1, the UE 120 may include a first communication manager 140. As described in more detail elsewhere herein, the first communication manager 140 may receive a neighbor cell list that indicates at least one neighbor cell; perform a cell selection procedure or a cell reselection procedure; and switch to a serving cell without receiving an updated neighbor cell list from the serving cell.

As described in more detail elsewhere herein, the first communication manager 140 may determine that a serving cell visibility duration satisfies a first threshold; determine that a new cell visibility duration satisfies a second threshold; and perform a cell reselection procedure to switch from the serving cell to the new cell based at least in part on determining that the first threshold is satisfied and the second threshold is satisfied.

As described in more detail elsewhere herein, the first communication manager 140 may determine that a cell type of a candidate cell satisfies a reselection priority condition; and perform a cell reselection procedure to switch from a serving cell to the candidate cell based at least in part on determining that the cell type of the candidate cell satisfies the reselection priority condition. Additionally, or alternatively, the first communication manager 10 may perform one or more other operations described herein.

As shown in FIG. 1, the base station 110 may include a second communication manager 150. As described in more detail elsewhere herein, the second communication manager 150 may perform one or more operations described herein.

As indicated above, FIG. 1 is provided merely as an example. Other examples may differ from what is described with regard to FIG. 1.

Figure 2:
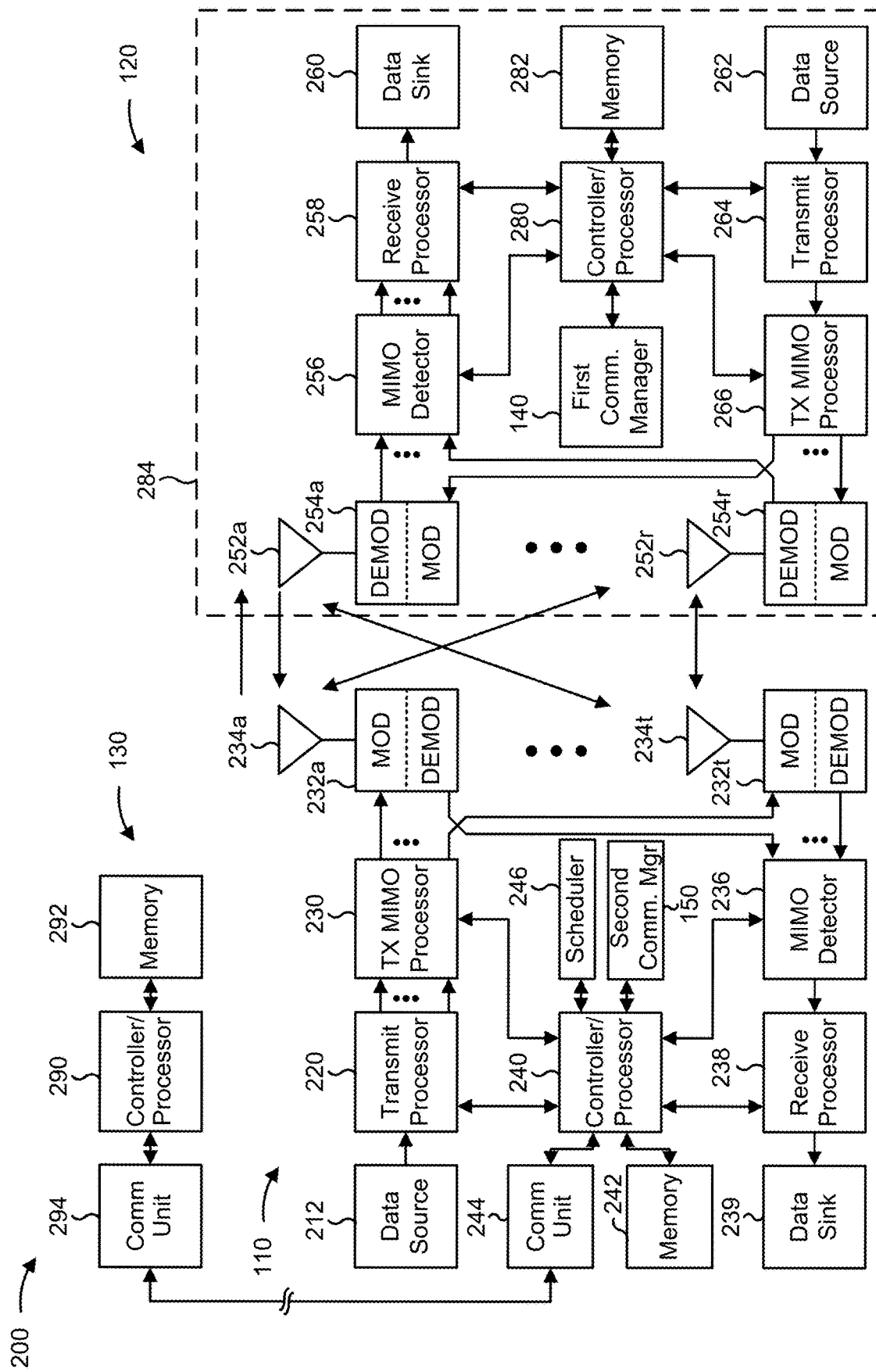
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/ or a CQI parameter. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports comprising RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 5-12.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 5-12.

Controller/processor 240 of base station 110, controller/processor 280 of UE 120, and/or any other component(s) of FIG. 2 may perform one or more techniques associated with neighbor cell list management in NTNs, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, process 800 of FIG. 8, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, process 800 of FIG. 8, and/or other processes as described herein. In some aspects, executing instructions may include running the instructions, converting the instructions, compiling the instructions, and/or interpreting the instructions, among other examples.

In some aspects, UE 120 may include means for receiving a neighbor cell list that indicates at least one neighbor cell; means for performing a cell selection procedure or a cell reselection procedure; and/or means for switching to a serving cell without receiving an updated neighbor cell list from the serving cell, among other examples. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, and/or receive processor 258, among other examples.

In some aspects, UE 120 may include means for determining that a serving cell visibility duration satisfies a first threshold, means for determining that a new cell visibility duration satisfies a second threshold, and/or means for performing a cell reselection procedure to switch from the serving cell to the new cell based at least in part on determining that the first threshold is satisfied and the second threshold is satisfied, among other examples. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, and/or receive processor 258, among other examples.

In some aspects, UE 120 may include means for determining that a cell type of a candidate cell satisfies a reselection priority condition and/or means for performing a cell reselection procedure to switch from a serving cell to the candidate cell based at least in part on determining that the cell type of the candidate cell satisfies the reselection priority condition, among other examples. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, and/or receive processor 258, among other examples.

In some aspects, base station 110 may include means for transmitting neighbor cell lists. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, and/or antenna 234, among other examples.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided merely as an example. Other examples may differ from what is described with regard to FIG. 2.

Figure 3:
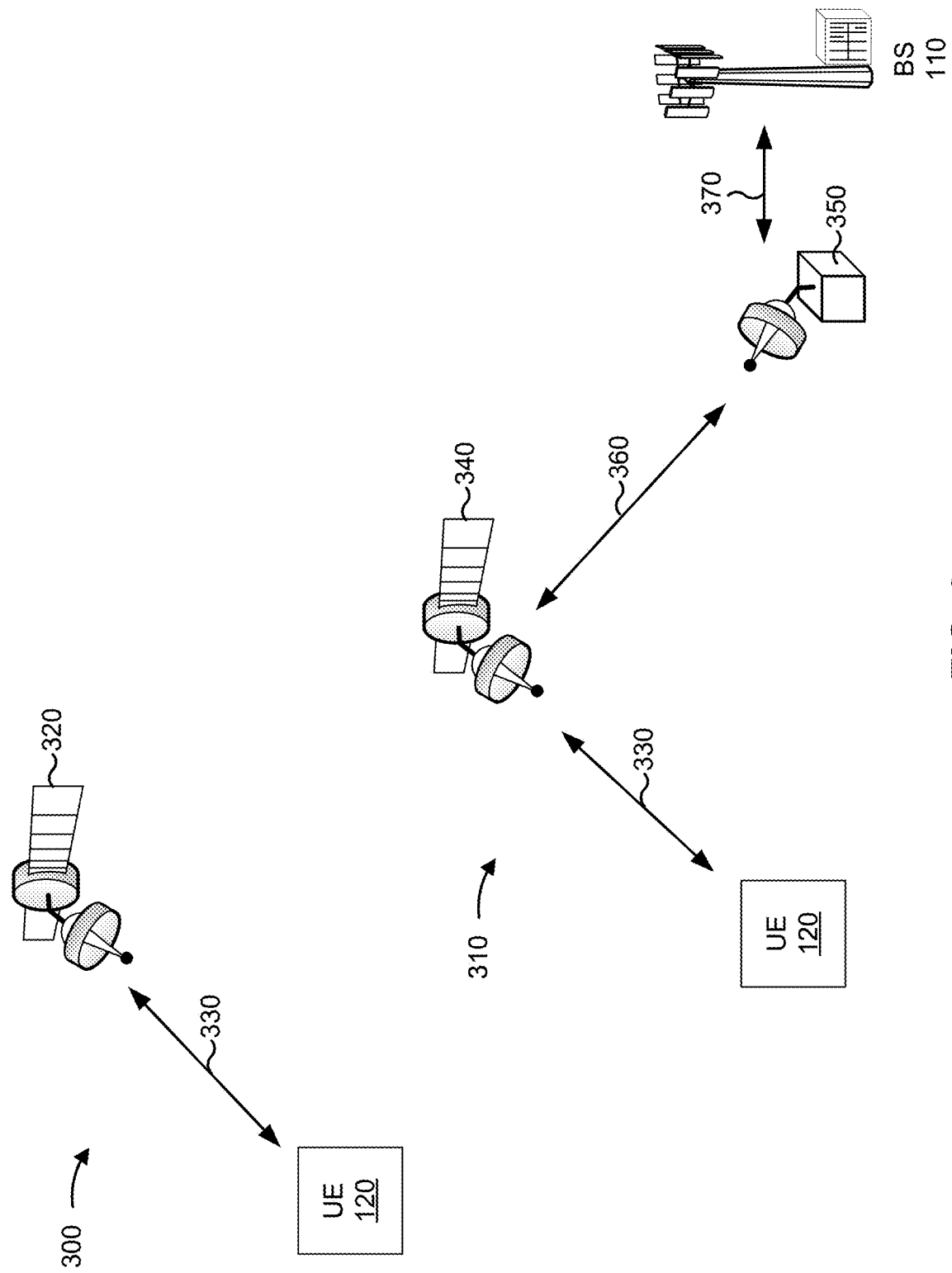
FIG. 3 is a diagram illustrating an example of a regenerative satellite deployment and an example of a transparent satellite deployment in a non-terrestrial network (NTN), in accordance with the present disclosure.

FIG. 3 is a diagram illustrating examples 300 and 310 of NTN deployments. The example 300 and/or the example 310 may be, be similar to, include, or be included in, a wireless network such as the wireless network 100 shown in, and described in connection with, FIG. 1.

Example 300 shows a conceptual depiction of a regenerative satellite deployment. In example 300, a UE 120 is served by a satellite 320 via a service link 330. For example, the satellite 320 may include a BS 110 (e.g., BS 110a), a gNB, and/or one or more functions (e.g., radio frequency (RF) filtering, frequency conversion, amplification, demodulation, decoding, switching, routing, coding, and/or modulation, among other examples) of a BS 110, among other examples. The service link 330 may include an NR-Uu interface that is terminated at the satellite 320. In some aspects, the satellite 320 may be referred to as a non-terrestrial base station, a regenerative repeater, and/or an on-board processing repeater, among other examples. In some aspects, the satellite 320 may demodulate an uplink radio frequency signal, and may modulate a baseband signal derived from the uplink radio signal to produce a downlink radio frequency transmission. The satellite 320 may transmit the downlink radio frequency signal on the service link 330. The satellite 320 may provide a cell that covers the UE 120.

Example 310 shows a transparent satellite deployment, which may also be referred to as a bent-pipe satellite deployment. In example 310, a UE 120 is served by a satellite 340 via the service link 330. The satellite 340 may be referred to as a transparent satellite, a bent-pipe satellite, and/or a non-terrestrial relay station, among other examples. The satellite 340 may relay a signal received from a terrestrial BS 110, via an NTN gateway 350. The satellite may repeat an NR-Uu interface via a feeder link 360. The NTN gateway 350 may communicatively connect the satellite 340 and the BS 110 using an RF link 370. For example, the satellite 340 may receive an uplink radio frequency transmission, and may transmit a downlink radio frequency transmission without demodulating the uplink radio frequency transmission. In some aspects, the satellite 340 may frequency convert the uplink radio frequency transmission received on the service link 330 to a frequency of the downlink radio frequency transmission on the feeder link 360, and may amplify and/or filter the uplink radio frequency transmission. In some aspects, the UEs 120 shown in example 300 and example 310 may be associated with a Global Navigation Satellite System (GNSS) capability, and/or a Global Positioning System (GPS) capability, among other examples, though not all UEs have such capabilities. The satellite 340 may provide and/or facilitate a cell that covers the UE 120.

The service link 330 may include a link between the satellite 340 and the UE 120, and may include one or more of an uplink or a downlink. The feeder link 360 may include a link between the satellite 340 and the gateway 350, and may include one or more parts of an uplink (e.g., from the UE 120 to the gateway 350) or a downlink (e.g., from the gateway 350 to the UE 120).

The feeder link 360 and the service link 330 may each experience Doppler effects due to the movement of the satellites 320 and 340, and potentially movement of a UE 120. These Doppler effects may be significantly larger than in a terrestrial network. The Doppler effect on the feeder link 360 may be compensated for to some degree, but may still be associated with some amount of uncompensated frequency error. Furthermore, the gateway 350 may be associated with a residual frequency error, and/or the satellite 320/340 may be associated with an on-board frequency error. These sources of frequency error may cause a received downlink frequency at the UE 120 to drift from a target downlink frequency.

As indicated above, FIG. 3 is provided as an example. Other examples may differ from what is described with regard to FIG. 3.

Figure 4:
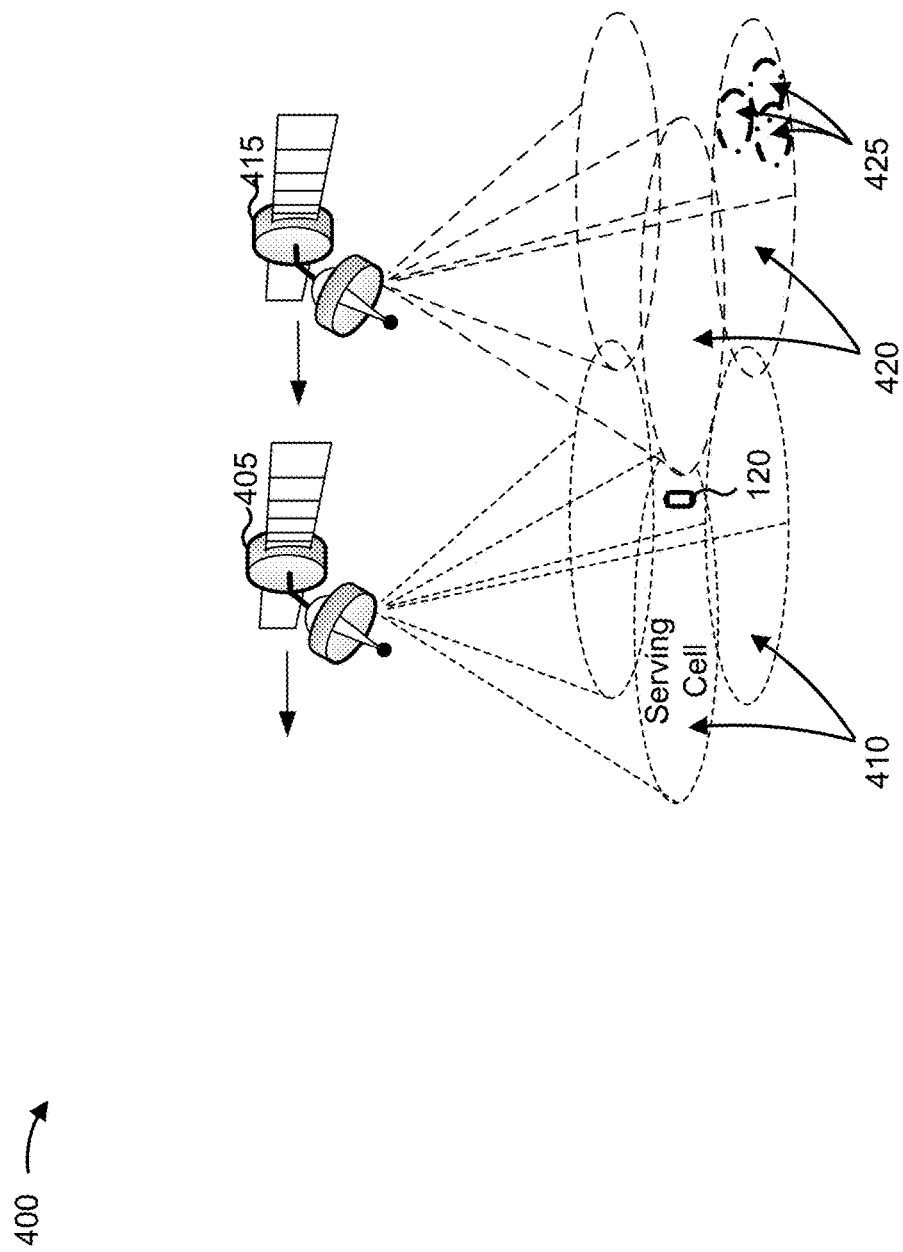
FIG. 4 is a diagram illustrating an example of a cell selection in an NTN, in accordance with the present disclosure.

FIG. 4 is a diagram illustrating an example 400 of cell selection in an NTN, in accordance with the present disclosure. As shown, a satellite 405 may serve a UE 120. The satellite 405 may provide one or more cells 410. Each cell 410 may include one or more beams. As shown, the UE 120 may be served by one of the cells (e.g., a "serving cell"). A satellite 415 may provide one or more cells 420. One or more of the cells 420 may be neighbor cells to the serving cell 410. The satellite 405 and/or 415 may include a base station 110 and/or a relay device, and may be, include, be included in, or be similar to, the satellite 320 shown in FIG. 3, and/or the satellite 340 shown in FIG. 3, among other examples.

The satellites 405 and/or 415 may use multiple antennas to form multiple beams that form beam footprints on the earth. In the illustrated examples, each cell 410 and/or 420 may include one or more beam footprints 425. One or more different frequency intervals may be associated with each beam to mitigate interference between beams, thereby facilitating simultaneous transmission and reception capabilities. In some cases, one or more different beams may be associated with a frequency interval. The frequency intervals may be, or include, narrowbands, and/or bandwidth parts, among other examples.

Each cell 410 and 420 may have one or more associated cell identifiers (IDs) and may have an associated set of cell selection/reselection parameters. A "set of cell selection/reselection parameters" refers to a set of parameters that may be used for selection of the cell during a cell selection procedure and/or reselection of the cell during a cell reselection procedure. The set of cell selection/reselection parameters may include one or more parameters. In some cases, the set of selection/reselection parameters may be provided to the UE 120 as part of a neighbor cell list. For example, in some cases, each time that the UE 120 switches to a cell 410 or 420 as a serving cell, the new serving cell provides a neighbor cell list that indicates neighbor cells of the serving cell. The indications of the neighbor cells may include corresponding cell selection/reselection parameters (which may be referred to as "cell selection parameters" throughout this document for brevity and clarity of description). The cell selection/reselection information may be provided via system information blocks (SIBs) such as SIB4 and/or SIB5.

As the satellite 405 and/or 415 moves, the corresponding cells move across the ground. A satellite may move as fast as, for example, 7 kilometers/second or faster. Due to the movement of the satellite 405 and/or 415, and thus the cell, a UE 120 may perform cell selection and/or reselection frequently. The UE 120 may perceive a change of cell coverage even though the UE 120 may be stationary. Frequent reselection of NTN cells may result in frequent discarding of stored neighbor cell lists, and acquisition of updated neighbor cell lists (e.g., SIBs), which may result in unnecessary communication traffic and power consumption at the UE 120.

Aspects of the techniques and apparatuses described herein may facilitate providing a neighbor cell to a UE and allowing the UE to perform a cell selection or reselection procedure, and to switch to a serving cell without discarding a stored neighbor cell list from the serving cell and without necessarily receiving an updated neighbor cell list. In some aspects, for example, the UE may store the list and/or cell selection/reselection parameters from the list and reuse the parameters when applicable. For example, in some aspects, a non-terrestrial device such as a satellite may return to a same position relative to the ground periodically and the UE may reuse cell selection/reselection information corresponding to the cell to reselect the cell when it returns. In some aspects, neighbor cells may move with future cells (cells that may become serving cells in the future). In this case, a neighbor cell list associated with a moving future cell may be retained and reused. Similarly, a list of potential future cells may be retained and reused. In this way, aspects may enable a UE to refrain from acquiring updated neighbor cell lists each time the UE performs a cell selection or reselection procedure. As a result, aspects may have positive impacts on the reliability of network communications, including decreased latency and increased throughput, and may reduce UE power consumption.

Additionally, in some cases, each time a UE 120 switches to a new serving cell, the UE 120 is constrained to wait for at least one second before beginning a new cell reselection process. Due to the speed of NTN cell movement, the one second constraint may result in reselection failure because a target cell (which may be referred to as a "new" cell or a "candidate" cell) may no longer be within a geographical area of the UE 120 upon expiry of the one second.

Aspects of the techniques and apparatuses described herein may allow for cell reselection after a delay that is based on the movement of the NTN cells. In some aspects, for example, in addition to determining that a new cell satisfies one or more selection and/or reselection criteria, the UE 120 may determine whether a set of two thresholds are satisfied. A first threshold may correspond to a visibility duration of the serving cell and the second threshold may correspond to a visibility duration of a candidate cell (which may be referred to as a "new cell"). "Visibility duration" refers to an amount of time remaining during which the cell will be visible to a UE such that the UE may camp on and/or connect to that cell. In this way, delays between cell selections and/or reselections may be based on cell movement, resulting in increased cell connectivity and decreases in UE power consumption (as the UE may not need to attempt unnecessary and unsuccessful cell reselections).

In some aspects, the visibility duration, the first threshold, and/or the second threshold may be provided by a network device (e.g., a base station and/or a relay station, among other examples) or selected by a UE. For example, the UE may select the visibility duration, the first threshold, and/or the second threshold from among a set of possible values. In some aspects, the visibility duration may be determined by a cell stop time broadcast in system information for a low earth orbit (LEO) fixed cell. For LEO moving cells, the visibility duration may be determined by beam and/or satellite information.

Additionally, in some cases, cell type priorities may be employed. For example, during cell selection, a terrestrial network (TN) cell may be prioritized over an NTN cell, and/or an LEO cell may be prioritized over a GEO cell, among other examples. Due to the frequent cell reselection resulting from fast moving non-terrestrial devices, the priority rules may result in the UE 120 ping-ponging between a TN cell and an NTN cell, and/or between an LEO cell and a GEO cell, among other examples.

Aspects of the techniques and apparatuses described herein may provide a reselection priority to be used where the frequency priority is the same, the cell reselection is intra-frequency, and/or priority information is not available. In some aspects, for reselection, a UE may prioritize a current serving cell type (e.g., a TN cell type, an NTN cell type, an LEO cell type, a GEO cell type, etc.). In some aspects, the network may broadcast a bias parameter corresponding to the prioritization of the cell type (e.g., to indicate a prioritized cell type). In this way, aspects may facilitate constraining cell reselection to a certain cell type, thereby avoiding ping-ponging between cell types that have significant differences in motion characteristics. As a result, aspects may have positive impacts on the reliability of network communications, including decreased latency and increased reselection success.

As indicated above, FIG. 4 is provided as an example. Other examples may differ from what is described with regard to FIG. 4.

Figure 5:
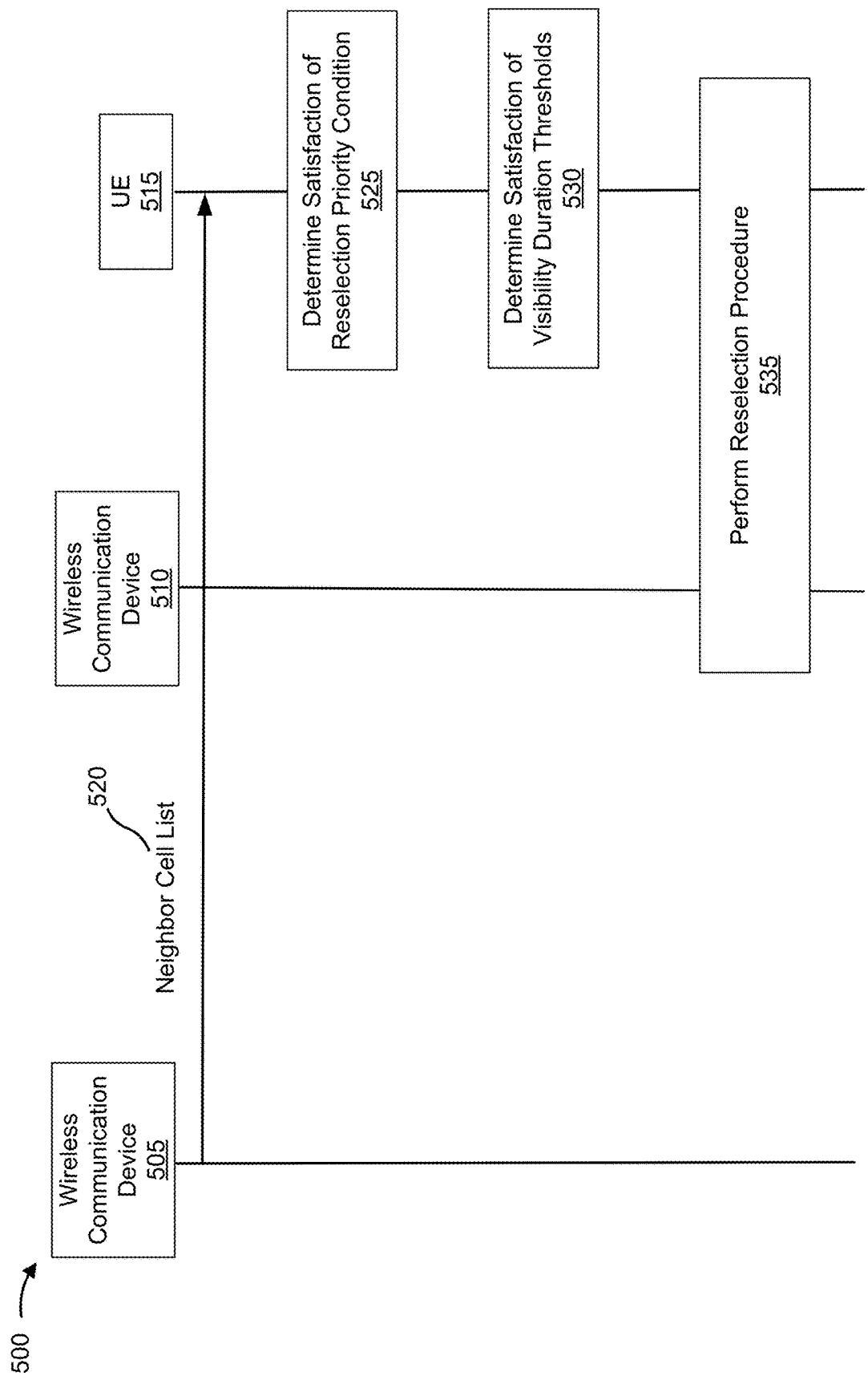
FIG. 5 is a diagram illustrating an example associated with neighbor cell list management in an NTN, in accordance with the present disclosure.

FIG. 5 is a diagram illustrating an example 500 of beam and narrowband management, in accordance with the present disclosure. As shown in FIG. 5, a wireless communication device 505 and a wireless communication device 510 may communicate with a UE 515. The wireless communication device 505 and/or 510 may include a non-terrestrial base station, and/or a non-terrestrial relay device, among other examples. The wireless communication device 505 and/or 510 may provide a cell for supporting wireless communications. The wireless communication device 505 and/or 510 may provide multiple beams within the cell, and the UE 515 may select beams to switch to as the UE 515 moves within the cell (or as the cell moves relative to the UE 515). The wireless communication device 505 may provide a serving cell to the UE 515.

As shown by reference number 520, the wireless communication device 505 may transmit, and the UE 515 may receive, a neighbor cell list that indicates at least one neighbor cell. The neighbor cell list may include a plurality of cell selection parameters configured to facilitate a cell selection procedure and/or a cell reselection procedure. The cell selection parameters may, therefore, include cell reselection parameters. In some aspects, the plurality of cell selection parameters may include at least one of a first set of cell selection parameters corresponding to at least one of a first frequency or a first cell identifier; and a second set of cell selection parameters corresponding to at least one of a second frequency or a second cell identifier. The plurality of cell selection parameters may be valid for a first geographical area. The first geographical area may correspond to a current location of the UE, and/or a specified location (e.g., via a signal and/or a wireless communication specification, among other examples).

The neighbor cell list may include one or more cell reselection parameters associated with a potential future serving cell. The one or more cell reselection parameters may correspond to one or more neighbor cells of the potential serving cell. In some aspects, the cell reselection parameters may include at least one of: a set of intra-frequency cell reselection parameters, or a set of inter-frequency cell reselection parameters. The UE 515 may perform a location update to indicate a location of the UE 515 to the network. The location of the UE 515 may correspond to a second geographical area, and the UE 515 may acquire an updated plurality of cell selection parameters that is valid for the second geographical area.

In some aspects, the UE 515 may detect at least one of a frequency or a cell identifier and determine, based at least in part on the neighbor cell list, a set of cell selection parameters that corresponds to the at least one of the frequency or the cell identifier. The UE 515 may perform an additional cell reselection procedure based at least in part on the set of cell selection parameters. For example, the wireless communication device 505 may be a satellite that returns to the same geographic location. In this case, if the UE 515 is stationary, relatively stationary, or returns to the location, the UE 515 may reuse the reselection parameters associated with that cell.

In some aspects, the UE 515 may detect a cell for which no cell selection/reselection parameters are stored. In this case, the UE 515 may decide to acquire the system information to update. In some aspects, the UE 515 may detect a cell and may determine that a neighbor cell list does not include a set of cell selection parameters corresponding to the cell. The UE 515 may acquire an updated neighbor cell list based at least in part on determining that the neighbor cell list does not include the set of cell selection parameters corresponding to the cell.

In some aspects, neighbor cells (e.g., provided by wireless communication device 510) may move in addition to the serving cell. A fixed set of intra-frequency and inter-frequency cell reselection parameters may be defined for a potential serving cell. A list of future cells that will cover the same area at a different time may be provided, based on a position and a velocity of the cell. In some aspects, the network may not indicate the time at which a future cell will be in the location of the UE 515. The UE 515 may calculate the time based on satellite and beam information. In some aspects, the list of future cells may include a list of next cells that share common system information. In some aspects, a list of neighbor cells and inter-frequency information may be provided. In some aspects, if the UE 515 reselects the next future cell, the UE 515 may not be required to acquire the intra-frequency neighbor cell list or inter-frequency carrier frequency list (e.g., SIB4 and SIB5 in LTE, and SIB3 and SIB4 in NR).

For example, the wireless communication device 505 may transmit, and the UE 515 may receive, a future cell coverage list that indicates one or more future cells. As indicated above, the one or more future cells may include one or more cells that will cover one or more locations of the UE 515 at one or more future time instances. The UE 515 may determine the one or more future time instances based at least in part on at least one of: an operating condition of the UE, device information corresponding to a non-terrestrial device (e.g., wireless communication device 510) that provides the future cell, or beam information corresponding to one or more beams provided by the non-terrestrial device.

In some aspects, the future cell coverage list may be valid for an associated validity time. The UE 515 may refrain from acquiring an updated neighbor cell list based at least in part on the future cell coverage list being valid. If the UE 515 determines that the validity time is expired, the UE 515 may acquire an updated future cell coverage list based at least in part on determining that the validity time is expired. In some aspects, the UE 515 may determine that the validity time is expired by detecting expiry of a validity time expiration timer. In some aspects, the network (e.g., the wireless communication device 505) may transmit, and the UE 515 may receive, an indication of expiration of the validity time.

In some aspects, the UE 515 may determine that a mobility level of the UE 515 satisfies an expiration condition corresponding to the future cell coverage list. The UE 515 may acquire an updated future cell coverage list based at least in part on determining that the mobility level of the UE 515 satisfies the expiration condition. For example, the mobility level may indicate a mobility state (e.g., whether the UE 515 is stationary or mobile), and/or a mobility degree (e.g., whether the UE 515 is moving at a speed that falls within a range of "slow" speeds, "medium" speeds, or "fast" speeds), among other examples.

As shown by reference number 525, the UE 515 may determine that a cell type of a candidate cell provided by wireless communication device 510 satisfies a reselection priority condition. In some aspects, the cell type of the candidate cell may include at least one of: a terrestrial cell type, a non-terrestrial cell type, a low-earth orbit cell type, a mid-earth orbit cell type, or a geostationary earth orbit cell type. The UE 515 may determine that a first frequency priority corresponding to the serving cell is the same as a second frequency priority corresponding to the candidate cell, and may determine that the cell type of the candidate cell satisfies the reselection priority condition based at least in part on determining that the first frequency priority is the same as the second frequency priority. In some aspects, the UE 515 may determine that a first frequency corresponding to the serving cell is different than a second frequency corresponding to the candidate cell, and may determine that the cell type of the candidate cell satisfies the reselection priority condition based at least in part on determining that the first frequency is different than the second frequency.

In some aspects, the UE 515 may determine that a first frequency corresponding to the serving cell is different than a second frequency corresponding to the candidate cell, and may determine that the cell type of the candidate cell satisfies the reselection priority condition based at least in part on determining that the first frequency is different than the second frequency. In some aspects, the UE 515 may determine that the cell type of the candidate cell satisfies the reselection priority condition based at least in part on determining that the cell type of the candidate cell is the same cell type as a cell type of the serving cell. In some aspects, the network (e.g., the wireless communication device 505) may transmit a broadcast message that indicates a bias parameter corresponding to the reselection priority condition. The bias parameter may indicate which parameter values are to be prioritized.

As shown by reference number 530, the UE 515 may determine that a serving cell visibility duration satisfies a first threshold and that a new cell visibility duration satisfies a second threshold. For example, in some aspects, the UE 515 may determine that a cell provided by the wireless communication device 510 satisfies one or more reselection criteria (e.g., based at least in part on measuring radio resource management signals associated with the cell). The UE 515 may determine that a serving cell visibility duration satisfies a first threshold (e.g., is greater than the first threshold). The UE 515 may determine that a new cell visibility duration associated with the cell provided by wireless communication device 510 satisfies a second threshold (e.g., is less than the second threshold). In some aspects, the UE 515 may determine that the new cell visibility duration associated with the cell satisfies the second threshold by determining, at least in part, that the new cell visibility is greater than the first threshold. The UE 515 may perform a cell reselection procedure to switch from the serving cell to the new cell based at least in part on determining that the first threshold is satisfied and the second threshold is satisfied. In some aspects, the second threshold may be greater than or equal to the first threshold.

In some aspects, the UE 515 may determine that the new cell satisfies a cell reselection criterion during a network defined reselection time interval. The determination of satisfaction of the cell reselection criterion may vary depending on whether the cell reselection procedure is an inter-frequency cell reselection procedure, an inter-radio access technology cell reselection procedure, and/or a ranking-based cell reselection procedure, among other examples.

As shown by reference number 535, the UE 515 may perform a cell reselection procedure to switch from the serving cell to the new cell. In some aspects, the UE 515 may perform a cell selection procedure or a cell reselection procedure to switch to the serving cell without receiving an updated neighbor cell list from the serving cell.

In some aspects, the serving cell may include a future cell, and the wireless communication device 505 may transmit, and the UE 515 may receive, a future cell coverage list. The future cell coverage list may indicate one or more additional future cells. Thus, the UE 515 may determine an occurrence of a cell reselection trigger (which may include a frequency measurement trigger). The UE 515 may determine that the additional future cell fails to satisfy a cell reselection criterion. The UE 515 may perform an additional cell reselection procedure to switch to a neighbor cell of the serving cell. In some aspects, the UE 515 may determine that the UE 515 does not include neighbor cell information associated with the neighbor cell of the serving cell. The UE 515 may acquire system information including the neighbor cell information, based at least in part on determining that the UE 515 does not include the neighbor cell information.

In some aspects, the UE 515 may fail to detect a cell that is included on a future cell coverage list, and, based on failing to detect such a cell, may acquire the system information comprising the neighbor cell information. A future cell coverage list is a list of cells that may be reselected by the UE 515. An allowed cell list also may indicate a list of cells that may be reselected by the UE 515. An allowed cell list may also indicate a list of cells that may be selected by the UE 515. Cells on the future cell coverage list may be in a neighbor cell list, and/or a future cell list, among other examples. In some aspects, cells on the future cell coverage list may not be included in other lists. In some aspects, the future cell coverage list may be provided by the network. In some aspects, the UE 515 may refrain from acquiring a neighbor cell list corresponding to the serving cell based at least in part on receiving the future cell coverage list. The serving cell may include the future cell, and the future cell coverage list may indicate an additional future cell. The UE 515 may determine an occurrence of a cell reselection trigger, determine that the additional future cell fails to satisfy a cell reselection criterion, detect a cell that is included on an allowed cell list, and based thereon, may perform an additional cell reselection procedure to switch to the cell that is included on the allowed cell list.

In some aspects, the serving cell may include the future cell. The future cell coverage list may indicate an additional future cell. The UE 515 may determine an occurrence of a cell reselection trigger and may determine that the additional future cell fails to satisfy a cell reselection criterion or may fail to detect a cell that is included on a future cell coverage list. Based at least in part on one or more of these determinations, the UE 515 may perform an additional cell reselection procedure to switch to a neighbor cell of the serving cell.

As indicated above, FIG. 5 is provided as an example. Other examples may differ from what is described with respect to FIG. 5.

Figure 6:
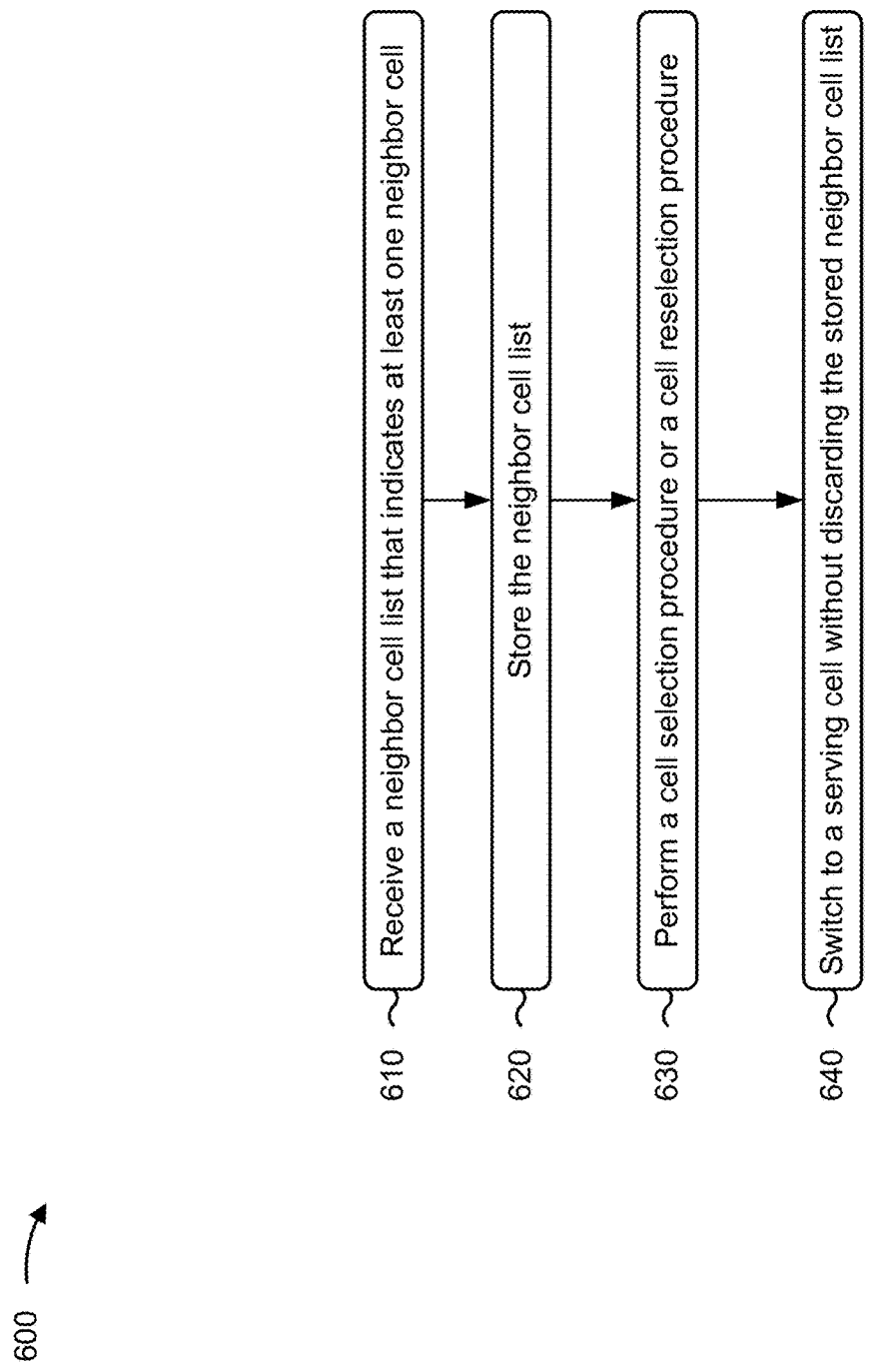
FIGS. 6-8 are diagrams illustrating example processes associated with neighbor cell list management in an NTN, in accordance with the present disclosure.

FIG. 6 is a diagram illustrating an example process 600 performed, for example, by a UE, in accordance with the present disclosure. Example process 600 is an example where the UE (e.g., UE 515 shown in FIG. 5) performs operations associated with neighbor cell list management in non-terrestrial networks.

As shown in FIG. 6, in some aspects, process 600 may include receiving a neighbor cell list that indicates at least one neighbor cell (block 610). For example, the UE (e.g., using reception component 902, depicted in FIG. 9) may receive a neighbor cell list that indicates at least one neighbor cell, as described above.

As further shown in FIG. 6, in some aspects, process 600 may include storing the neighbor cell list (block 620). For example, the UE (e.g., using communication manager 904, depicted in FIG. 9) may store the neighbor cell list, as described above.

As further shown in FIG. 6, in some aspects, process 600 may include performing a cell selection procedure or a cell reselection procedure (block 630). For example, the UE (e.g., using communication manager 904) may perform a cell selection procedure or a cell reselection procedure, as described above.

As further shown in FIG. 6, in some aspects, process 600 may include switching to a serving cell without discarding the stored neighbor cell list (block 640). For example, the UE (e.g., using communication manager 904) may switch to a serving cell without discarding the stored neighbor cell list, as described above.

Process 600 may include additional aspects, such as any single aspect or any combination of aspects described below and/or in connection with one or more other processes described elsewhere herein.

In a first aspect, the neighbor cell list comprises a plurality of cell selection parameters configured to facilitate the cell selection procedure or the cell reselection procedure.

In a second aspect, alone or in combination with the first aspect, the plurality of cell selection parameters comprises a first set of cell selection parameters corresponding to at least one of a first frequency or a first cell identifier, and a second set of cell selection parameters corresponding to at least one of a second frequency or a second cell identifier.

In a third aspect, alone or in combination with one or more of the first and second aspects, the plurality of cell selection parameters are valid for a first geographical area.

In a fourth aspect, alone or in combination with the third aspect, process 600 includes performing a location update to indicate a location of the UE, wherein the location of the UE corresponds to a second geographical area, and acquiring an updated plurality of cell selection parameters that is valid for the second geographical area.

In a fifth aspect, alone or in combination with one or more of the first through fourth aspects, process 600 includes detecting at least one of a frequency or a cell identifier, and determining, based at least in part on the stored neighbor cell list, a set of cell selection parameters that corresponds to the at least one of the frequency or the cell identifier.

In a sixth aspect, alone or in combination with the fifth aspect, process 600 includes performing an additional cell reselection procedure based at least in part on the set of cell selection parameters.

In a seventh aspect, alone or in combination with the first aspect, process 600 includes detecting a cell, determining that the stored neighbor cell list does not include a set of cell selection parameters corresponding to the cell, and acquiring an updated neighbor cell list based at least in part on determining that the neighbor cell list does not include the set of cell selection parameters corresponding to the cell.

In an eighth aspect, alone or in combination with one or more of the first through seventh aspects, the neighbor cell list comprises one or more cell reselection parameters associated with a potential future serving cell.

In a ninth aspect, alone or in combination with the eighth aspect, the one or more cell reselection parameters correspond to one or more neighbor cells of the potential future serving cell.

In a tenth aspect, alone or in combination with one or more of the eight or ninth aspects, the one or more cell reselection parameters comprise at least one of a set of intra-frequency cell reselection parameters, or a set of inter-frequency cell reselection parameters.

In an eleventh aspect, alone or in combination with one or more of the first through tenth aspects, process 600 includes receiving a future cell coverage list that indicates one or more future cells, wherein the one or more future cells comprise a cell that will cover a location of the UE at one or more future time instances.

In a twelfth aspect, alone or in combination with the eleventh aspect, process 600 includes determining the one or more future time instances based at least in part on at least one of an operating time of the UE, information corresponding to a non-terrestrial device that provides the future cell, or beaming information corresponding to one or more beams provided by the non-terrestrial device.

In a thirteenth aspect, alone or in combination with one or more of the eleventh or twelfth aspects, the neighbor cell list corresponds to the future cell.

In a fourteenth aspect, alone or in combination with one or more of the eleventh through thirteenth aspects, the serving cell comprises the future cell.

In a fifteenth aspect, alone or in combination with one or more of the eleventh through fourteenth aspects, the future cell coverage list comprises at least one of a cell identifier corresponding to the future cell, a carrier frequency corresponding to the future cell, or a cell reselection parameter corresponding to the future cell.

In a sixteenth aspect, alone or in combination with one or more of the eleventh through fifteenth aspects, the future cell coverage list is valid for an associated validity time.

In a seventeenth aspect, alone or in combination with the sixteenth aspect, process 600 includes refraining from acquiring an updated neighbor cell list based at least in part on the future cell coverage list being valid.

In an eighteenth aspect, alone or in combination with one or more of the sixteenth or seventeenth aspects, process 600 includes determining that the validity time is expired, and acquiring an updated future cell coverage list based at least in part on determining that the validity time is expired.

In a nineteenth aspect, alone or in combination with the eighteenth aspect, determining that the validity time is expired comprises detecting expiry of a validity time expiration timer.

In a twentieth aspect, alone or in combination with the eighteenth aspect, determining that the validity time is expired comprises receiving an indication of expiration of the validity time.

In a twenty-first aspect, alone or in combination with one or more of the eleventh through twentieth aspects, process 600 includes determining that a mobility level of the UE satisfies an expiration condition corresponding to the future cell coverage list, and acquiring an updated future cell coverage list based at least in part on determining that the mobility level of the UE satisfies the expiration condition.

In a twenty-second aspect, alone or in combination with one or more of the eleventh through twenty-first aspects, the serving cell comprises the future cell, and wherein the future cell coverage list indicates an additional future cell, the method further comprising determining an occurrence of a cell reselection trigger, determining that the additional future cell fails to satisfy a cell reselection criterion, and performing an additional cell reselection procedure to switch to a neighbor cell of the serving cell.

In a twenty-third aspect, alone or in combination with the twenty-second aspect, process 600 includes determining that the UE does not have stored neighbor cell information associated with the neighbor cell of the serving cell, and acquiring system information comprising the neighbor cell information, based at least in part on determining that the UE does not have stored neighbor cell information.

In a twenty-fourth aspect, alone or in combination with the twenty-third aspect, process 600 includes failing to detect a cell that is included on a future cell coverage list, wherein acquiring the system information comprising the neighbor cell information comprises acquiring the system information comprising the neighbor cell information based at least in part on failing to detect a cell that is included on a future cell coverage cell list.

In a twenty-fifth aspect, alone or in combination with one or more of the eleventh through twenty-fourth aspects, process 600 includes refraining from acquiring a neighbor cell list corresponding to the serving cell based at least in part on receiving the future cell coverage list.

In a twenty-sixth aspect, alone or in combination with one or more of the eleventh through twenty-fifth aspects, the serving cell comprises the future cell, and wherein the future cell coverage list indicates an additional future cell, the method further comprising determining an occurrence of a cell reselection trigger, determining that the additional future cell fails to satisfy a cell reselection criterion, detecting a cell that is included on an allowed cell list, and performing an additional cell reselection procedure to switch to the cell that is included on the allowed cell list.

In a twenty-seventh aspect, alone or in combination with one or more of the eleventh through twenty-sixth aspects, the serving cell comprises the future cell, and wherein the future cell coverage list indicates an additional future cell, the method further comprising determining an occurrence of a cell reselection trigger, determining that the additional future cell fails to satisfy a cell reselection criterion, failing to detect a cell that is included on a future cell coverage list, and performing an additional cell reselection procedure to switch to a neighbor cell of the serving cell.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
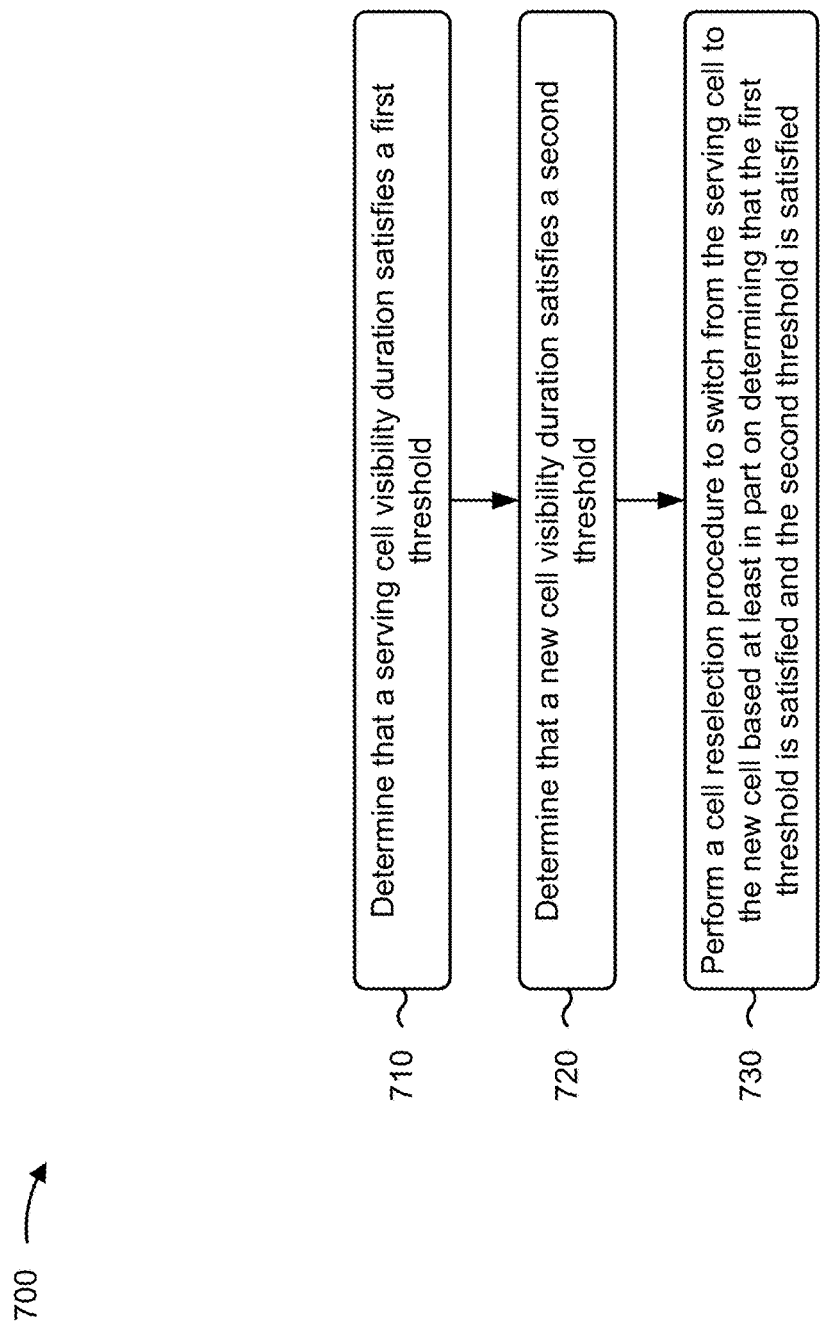

FIG. 7 is a diagram illustrating an example process 700 performed, for example, by a UE, in accordance with the present disclosure. Example process 700 is an example where the UE (e.g., UE 515 shown in FIG. 5) performs operations associated with neighbor cell list management in non-terrestrial networks.

As shown in FIG. 7, in some aspects, process 700 may include determining that a serving cell visibility duration of a serving cell satisfies a first threshold (block 710). For example, the UE (e.g., using communication manager 904, depicted in FIG. 9) may determine that a serving cell visibility duration of a serving cell satisfies a first threshold, as described above.

As further shown in FIG. 7, in some aspects, process 700 may include determining that a new cell visibility duration of a new cell satisfies a second threshold (block 720). For example, the UE (e.g., using communication manager 904) may determine that a new cell visibility duration of a new cell satisfies a second threshold, as described above.

As further shown in FIG. 7, in some aspects, process 700 may include performing a cell reselection procedure to switch from the serving cell to the new cell based at least in part on determining that the first threshold is satisfied and the second threshold is satisfied (block 730). For example, the UE (e.g., using communication manager 904, depicted in FIG. 9) may perform a cell reselection procedure to switch from the serving cell to the new cell based at least in part on determining that the first threshold is satisfied and the second threshold is satisfied, as described above.

Process 700 may include additional aspects, such as any single aspect or any combination of aspects described below and/or in connection with one or more other processes described elsewhere herein.

In a first aspect, determining that the serving cell visibility duration satisfies the first threshold comprises determining that the serving cell visibility duration is less than the first threshold, wherein the first threshold is a value provided by a network device or a value selected by the UE.

In a second aspect, alone or in combination with the first aspect, determining that the new cell visibility duration satisfies the second threshold comprises determining that the new cell visibility duration is greater than the second threshold.

In a third aspect, alone or in combination with one or more of the first through second aspects, determining that the new cell visibility duration satisfies the second threshold comprises determining that the new cell visibility duration is greater than the first threshold.

In a fourth aspect, alone or in combination with one or more of the first through third aspects, the second threshold is greater than or equal to the first threshold.

In a fifth aspect, alone or in combination with one or more of the first through fourth aspects, the cell reselection procedure comprises an inter-frequency cell reselection procedure.

In a sixth aspect, alone or in combination with one or more of the first through fifth aspects, the cell reselection procedure comprises an inter-radio access technology cell reselection procedure.

In a seventh aspect, alone or in combination with one or more of the first through sixth aspects, the cell reselection procedure comprises a ranking-based cell reselection procedure.

In an eighth aspect, alone or in combination with one or more of the first through seventh aspects, process 700 includes determining that the new cell satisfies a cell reselection criterion during a network defined reselection time interval.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
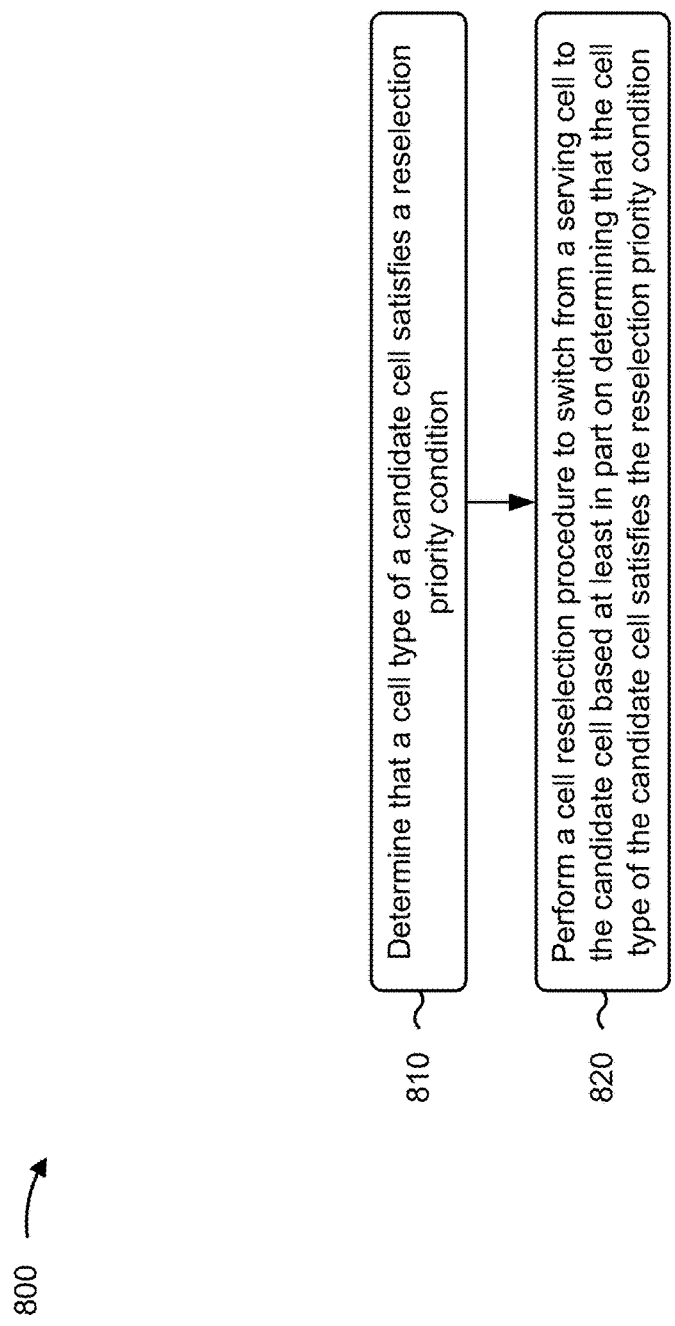

FIG. 8 is a diagram illustrating an example process 800 performed, for example, by a UE, in accordance with the present disclosure. Example process 800 is an example where the UE (e.g., UE 515 shown in FIG. 5) performs operations associated with neighbor cell list management in non-terrestrial networks.

As shown in FIG. 8, in some aspects, process 800 may include determining that a cell type of a candidate cell satisfies a reselection priority condition (block 810). For example, the UE (e.g., using communication manager 904, depicted in FIG. 9) may determine that a cell type of a candidate cell satisfies a reselection priority condition, as described above.

As further shown in FIG. 8, in some aspects, process 800 may include performing a cell reselection procedure to switch from a serving cell to the candidate cell based at least in part on determining that the cell type of the candidate cell satisfies the reselection priority condition (block 820). For example, the UE (e.g., using communication manager 904, depicted in FIG. 9) may perform a cell reselection procedure to switch from a serving cell to the candidate cell based at least in part on determining that the cell type of the candidate cell satisfies the reselection priority condition, as described above.

Process 800 may include additional aspects, such as any single aspect or any combination of aspects described below and/or in connection with one or more other processes described elsewhere herein.

In a first aspect, the cell type of the candidate cell comprises at least one of a terrestrial cell type, a non-terrestrial cell type, a low-earth orbit cell type, a mid-earth orbit cell type, or a geostationary earth orbit cell type.

In a second aspect, alone or in combination with the first aspect, process 800 includes determining that a first frequency priority corresponding to the serving cell is the same as a second frequency priority corresponding to the candidate cell, wherein determining that the cell type of the candidate cell satisfies the reselection priority condition comprises determining that the cell type of the candidate cell satisfies the reselection priority condition based at least in part on determining that the first frequency priority is the same as the second frequency priority.

In a third aspect, alone or in combination with one or more of the first and second aspects, process 800 includes determining that a first frequency corresponding to the serving cell is different than a second frequency corresponding to the candidate cell, wherein determining that the cell type of the candidate cell satisfies the reselection priority condition comprises determining that the cell type of the candidate cell satisfies the reselection priority condition based at least in part on determining that the first frequency is different than the second frequency.

In a fourth aspect, alone or in combination with one or more of the first through third aspects, process 800 includes determining that frequency priority information corresponding to the candidate cell is not available, wherein determining that the cell type of the candidate cell satisfies the reselection priority condition comprises determining that the cell type of the candidate cell satisfies the reselection priority condition based at least in part on determining that the frequency priority information corresponding to the candidate cell is not available.

In a fifth aspect, alone or in combination with one or more of the first through fourth aspects, determining that the cell type of the candidate cell satisfies the reselection priority condition comprises determining that the cell type of the candidate cell is the same cell type as a cell type of the serving cell.

In a sixth aspect, alone or in combination with one or more of the first through fifth aspects, process 800 includes receiving a broadcast message that indicates a bias parameter corresponding to the reselection priority condition.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
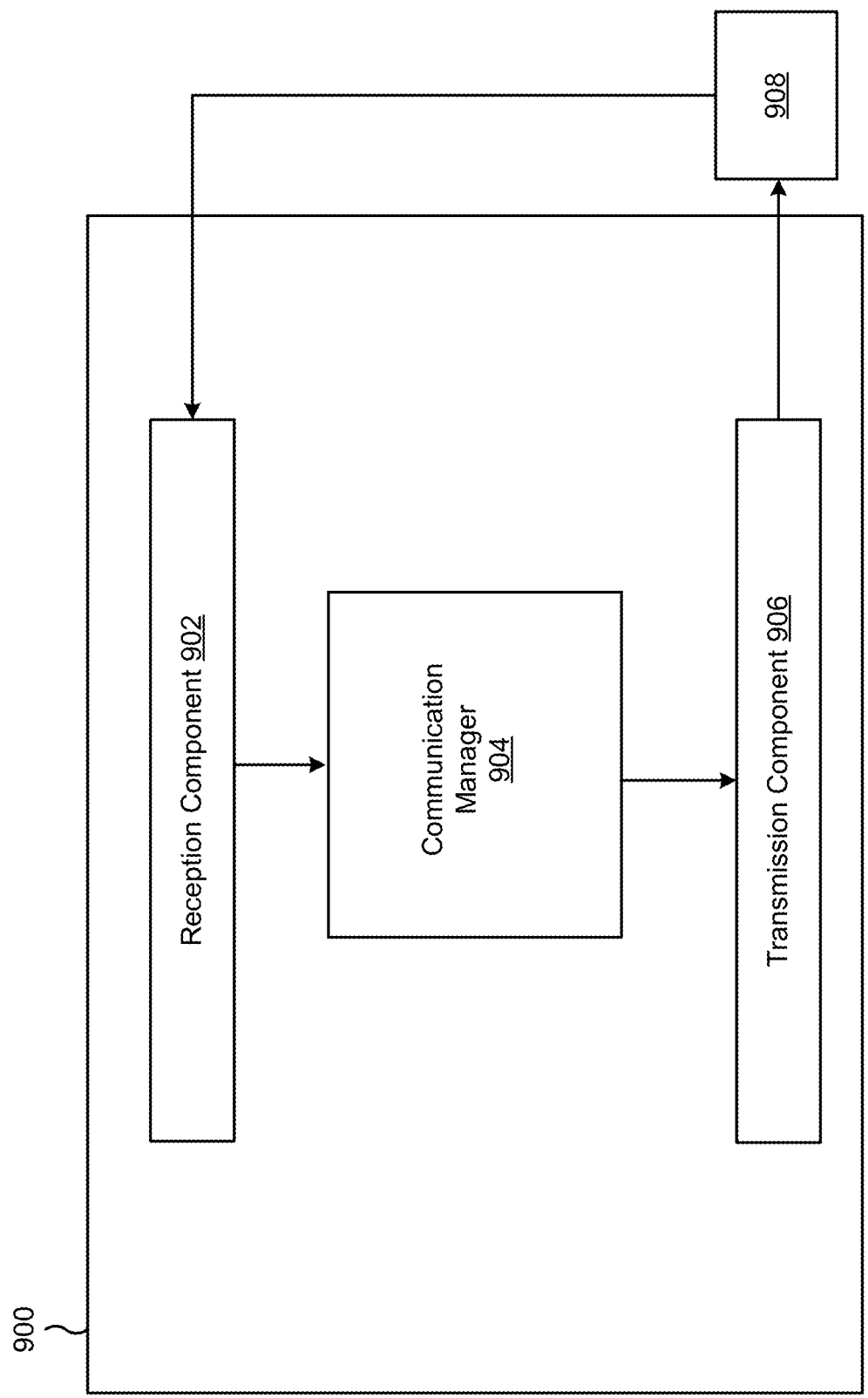
FIGS. 9-12 are block diagrams of example apparatuses for wireless communication, in accordance with the present disclosure.

FIG. 9 is a block diagram of an example apparatus 900 for wireless communication in accordance with the present disclosure. The apparatus 900 may be, be similar to, include, or be included in a UE (e.g., UE 515 shown in FIG. 5). In some aspects, the apparatus 900 includes a reception component 902, a communication manager 904, and a transmission component 906, which may be in communication with one another (for example, via one or more buses). As shown, the apparatus 900 may communicate with another apparatus 908 (such as a client, a server, a UE, a base station, or another wireless communication device) using the reception component 902 and the transmission component 906.

In some aspects, the apparatus 900 may be configured to perform one or more operations described herein in connection with FIG. 5. Additionally, or alternatively, the apparatus 900 may be configured to perform one or more processes described herein, such as process 600 of FIG. 6, process 700 of FIG. 7, or process 800 of FIG. 8, among other processes. In some aspects, the apparatus 900 may include one or more components of the first UE described above in connection with FIG. 2.

The reception component 902 may provide means for receiving communications, such as reference signals, control information, data communications, or a combination thereof, from the apparatus 908. The reception component 902 may provide received communications to one or more other components of the apparatus 900, such as the communication manager 904. In some aspects, the reception component 902 may provide means for signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 902 may include one or more antennas, a demodulator, a MIMO detector, a receive processor, a controller/processor, a memory, or a combination thereof, of the first UE described above in connection with FIG. 2.

The transmission component 906 may provide means for transmitting communications, such as reference signals, control information, data communications, or a combination thereof, to the apparatus 908. In some aspects, the communication manager 904 may generate communications and may transmit the generated communications to the transmission component 906 for transmission to the apparatus 908. In some aspects, the transmission component 906 may provide means for performing signal processing on the generated communications (such as filtering, amplification, modulation, digital-to-analog conversion, multiplexing, interleaving, mapping, or encoding, among other examples), and may transmit the processed signals to the apparatus 908. In some aspects, the transmission component 906 may include one or more antennas, a modulator, a transmit MIMO processor, a transmit processor, a controller/processor, a memory, or a combination thereof, of the first UE described above in connection with FIG. 2. In some aspects, the transmission component 906 may be co-located with the reception component 902 in a transceiver.

In some aspects, the communication manager 904 may provide means for receiving a neighbor cell list that indicates at least one neighbor cell; and performing a cell selection procedure or a cell reselection procedure to switch to a serving cell without receiving an updated neighbor cell list from the serving cell. In some aspects, the communication manager 904 may provide means for determining that a serving cell visibility duration satisfies a first threshold; determining that a new cell visibility duration satisfies a second threshold; and performing a cell reselection procedure to switch from the serving cell to the new cell based at least in part on determining that the first threshold is satisfied and the second threshold is satisfied. In some aspects, the communication manager 904 may provide means for determining that a cell type of a candidate cell satisfies a reselection priority condition; and performing a cell reselection procedure to switch from a serving cell to the candidate cell based at least in part on determining that the cell type of the candidate cell satisfies the reselection priority condition.

In some aspects, the communication manager 904 may include a controller/processor, a memory, or a combination thereof, of the first UE described above in connection with FIG. 2. In some aspects, the communication manager 904 may include the reception component 902 and/or the transmission component 906, among other examples. In some aspects, the means provided by the communication manager 904 may include, or be included within, means provided by the reception component 902 and/or the transmission component 906, among other examples.

In some aspects, the communication manager 904 and/or one or more components of the communication manager 904 may include or may be implemented within hardware (e.g., the circuitry described in connection with FIG. 2). In some aspects, the communication manager 904 and/or one or more components thereof may include or may be implemented within a controller/processor, a memory, or a combination thereof, of the UE 120 described above in connection with FIG. 2.

In some aspects, the communication manager 904 and/or one or more components of the communication manager 904 may be implemented in code (e.g., as software or firmware stored in a memory). For example, the communication manager 904 and/or a component (or a portion of a component) of the communication manager 904 may be implemented as instructions or code stored in a non-transitory computer-readable medium and executable by a controller or a processor to perform the functions or operations of the communication manager 904 and/or the component. If implemented in code, the functions of the communication manager 904 and/or a component may be executed by a controller/processor, a memory, a scheduler, a communication unit, or a combination thereof, of the UE 120 described above in connection with FIG. 2.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
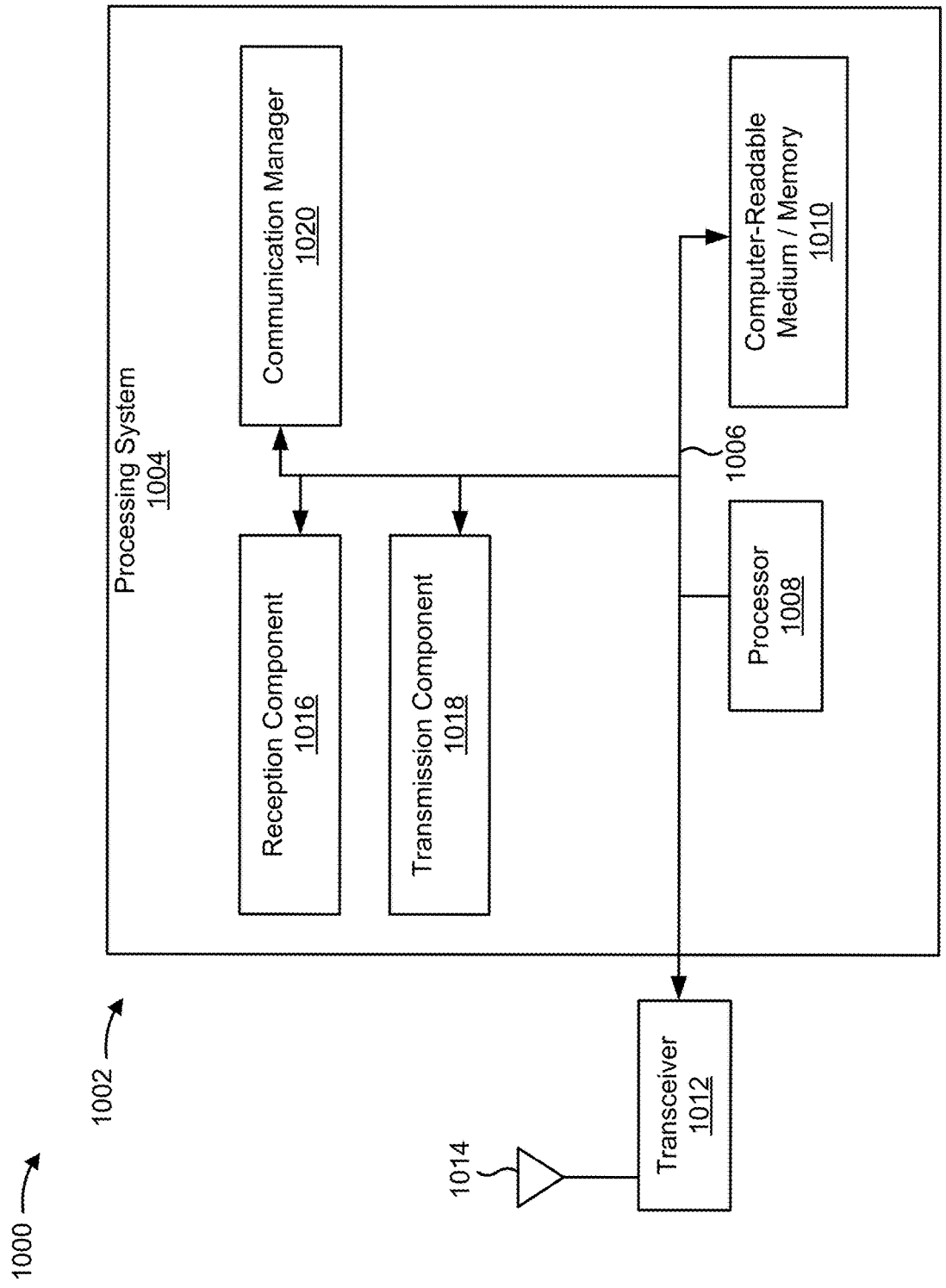

FIG. 10 is a diagram illustrating an example 1000 of a hardware implementation for an apparatus 1002 employing a processing system 1004. The apparatus 1002 may be, be similar to, include, or be included in the apparatus 900 shown in FIG. 9.

The processing system 1004 may be implemented with a bus architecture, represented generally by the bus 1006. The bus 1006 may include any number of interconnecting buses and bridges depending on the specific application of the processing system 1004 and the overall design constraints. The bus 1006 links together various circuits including one or more processors and/or hardware components, represented by a processor 1008, the illustrated components, and the computer-readable medium/memory 1010. The bus 1006 may also link various other circuits, such as timing sources, peripherals, voltage regulators, and/or power management circuits, among other examples.

The processing system 1004 may be coupled to a transceiver 1012. The transceiver 1012 is coupled to one or more antennas 1014. The transceiver 1012 provides a means for communicating with various other apparatuses over a transmission medium. The transceiver 1012 receives a signal from the one or more antennas 1014, extracts information from the received signal, and provides the extracted information to the processing system 1004, specifically a reception component 1016. In addition, the transceiver 1012 receives information from the processing system 1004, specifically a transmission component 1018, and generates a signal to be applied to the one or more antennas 1014 based at least in part on the received information. The processing system may include a communication manager 1020 configured to manage one or more operations associated with communications described herein.

The processor 1008 is coupled to the computer-readable medium/memory 1010. The processor 1008 is responsible for general processing, including the execution of software stored on the computer-readable medium/memory 1010. The software, when executed by the processor 1008, causes the processing system 1004 to perform the various functions described herein in connection with a client. The computer-readable medium/memory 1010 may also be used for storing data that is manipulated by the processor 1008 when executing software. The processing system 1004 may include any number of additional components not illustrated in FIG. 10. The components illustrated and/or not illustrated may be software modules miming in the processor 1008, resident/stored in the computer-readable medium/memory 1010, one or more hardware modules coupled to the processor 1008, or some combination thereof.

In some aspects, the processing system 1004 may be a component of the UE 120 and may include the memory 282 and/or at least one of the TX MIMO processor 266, the receive (RX) processor 258, and/or the controller/processor 280. In some aspects, the apparatus 1002 for wireless communication provides means for receiving a neighbor cell list that indicates at least one neighbor cell; and performing a cell selection procedure or a cell reselection procedure to switch to a serving cell without receiving an updated neighbor cell list from the serving cell. In some aspects, the apparatus 1002 for wireless communication provides means for determining that a serving cell visibility duration satisfies a first threshold; determining that a new cell visibility duration satisfies a second threshold; and performing a cell reselection procedure to switch from the serving cell to the new cell based at least in part on determining that the first threshold is satisfied and the second threshold is satisfied. In some aspects, the apparatus 1002 for wireless communication provides means determining that a cell type of a candidate cell satisfies a reselection priority condition; and performing a cell reselection procedure to switch from a serving cell to the candidate cell based at least in part on determining that the cell type of the candidate cell satisfies the reselection priority condition.

The aforementioned means may be one or more of the aforementioned components of the processing system 1004 of the apparatus 1002 configured to perform the functions recited by the aforementioned means. As described elsewhere herein, the processing system 1004 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 10 is provided as an example. Other examples may differ from what is described in connection with FIG. 10.

Figure 11:
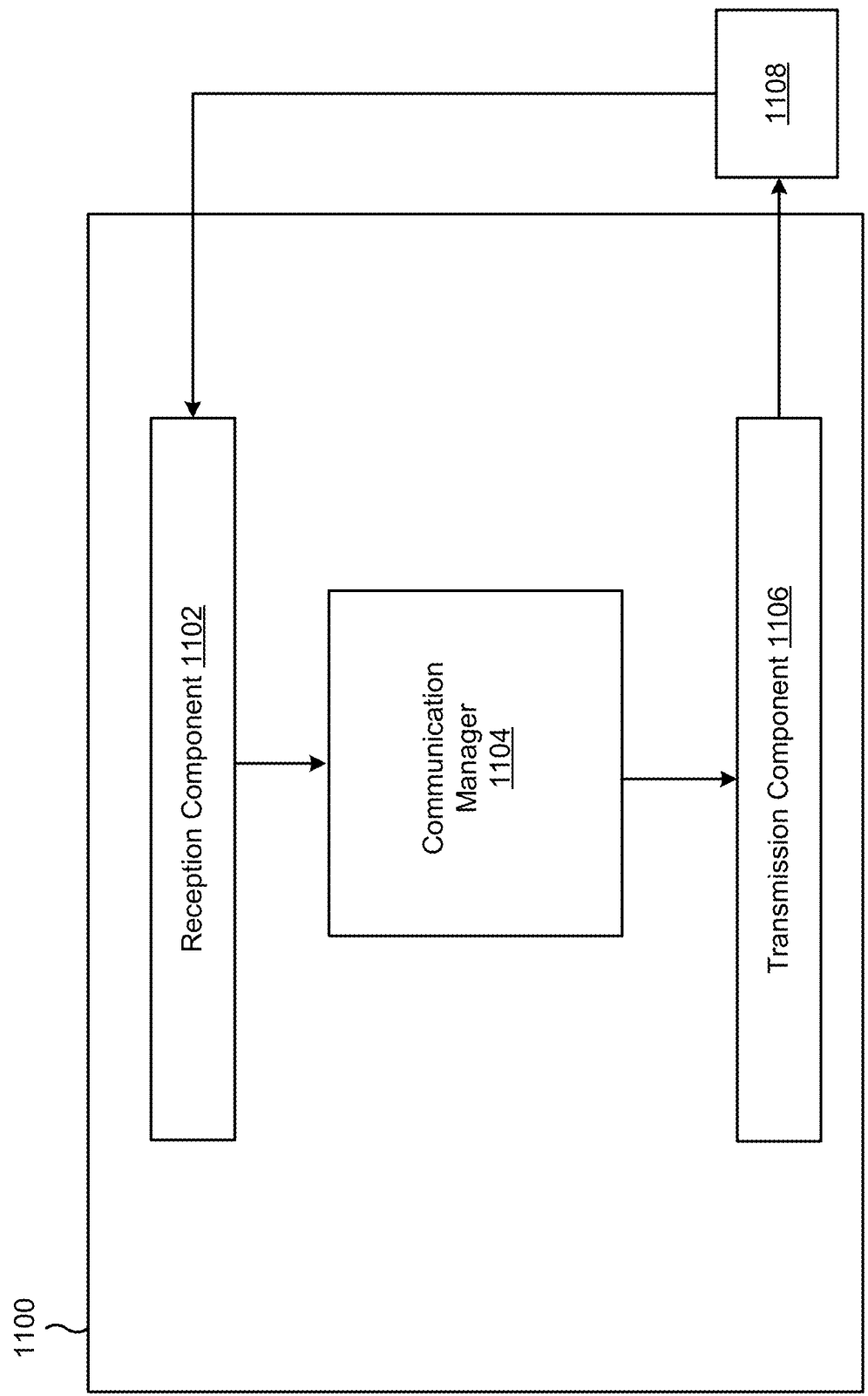

FIG. 11 is a block diagram of an example apparatus 1100 for wireless communication in accordance with the present disclosure. The apparatus 1100 may be, be similar to, include, or be included in a wireless communication device (e.g., wireless communication device 505 shown in FIG. 5). In some aspects, the apparatus 1100 includes a reception component 1102, a communication manager 1104, and a transmission component 1106, which may be in communication with one another (for example, via one or more buses). As shown, the apparatus 1100 may communicate with another apparatus 1108 (such as a client, a server, a UE, a base station, or another wireless communication device) using the reception component 1102 and the transmission component 1106.

In some aspects, the apparatus 1100 may be configured to perform one or more operations described herein in connection with FIG. 5. Additionally, or alternatively, the apparatus 1100 may be configured to perform one or more processes described herein. In some aspects, the apparatus 1100 may include one or more components of the base station described above in connection with FIG. 2.

The reception component 1102 may provide means for receiving communications, such as reference signals, control information, data communications, or a combination thereof, from the apparatus 1108. The reception component 1102 may provide received communications to one or more other components of the apparatus 1100, such as the communication manager 1104. In some aspects, the reception component 1102 may provide means for performing signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1102 may include one or more antennas, a demodulator, a MIMO detector, a receive processor, a controller/processor, a memory, or a combination thereof, of the base station described above in connection with FIG. 2.

The transmission component 1106 may provide means for transmitting communications, such as reference signals, control information, data communications, or a combination thereof, to the apparatus 1108. In some aspects, the communication manager 1104 may generate communications and may transmit the generated communications to the transmission component 1106 for transmission to the apparatus 1108. In some aspects, the transmission component 1106 may provide means for performing signal processing on the generated communications (such as filtering, amplification, modulation, digital-to-analog conversion, multiplexing, interleaving, mapping, or encoding, among other examples), and may transmit the processed signals to the apparatus 1108. In some aspects, the transmission component 1106 may include one or more antennas, a modulator, a transmit MIMO processor, a transmit processor, a controller/processor, a memory, or a combination thereof, of the base station described above in connection with FIG. 2. In some aspects, the transmission component 1106 may be co-located with the reception component 1102 in a transceiver.

The communication manager 1104 may provide means for transmitting a neighbor cell list, a future cell list, and/or other system information, means for providing a cell, means for accommodating a UE cell selection procedure, and/or means accommodating a UE cell reselection procedure, among other examples. In some aspects, the communication manager 1104 may include a controller/processor, a memory, a scheduler, a communication unit, or a combination thereof, of the base station described above in connection with FIG. 2. In some aspects, the communication manager 1104 may include the reception component 1102 and/or the transmission component 1106, among other examples. In some aspects, the means provided by the communication manager 1104 may include, or be included within, means provided by the reception component 1102 and/or the transmission component 1106, among other examples.

In some aspects, the communication manager 1104 and/or one or more components thereof may include or may be implemented within hardware. In some aspects, the communication manager 1104 and/or one or more components thereof may include or may be implemented within a controller/processor, a memory, or a combination thereof, of the BS 110 described above in connection with FIG. 2.

In some aspects, the communication manager 1104 and/or one or more components thereof may be implemented in code (e.g., as software or firmware stored in a memory). For example, the communication manager 1104 and/or a component (or a portion of a component) of the communication manager 1104 may be implemented as instructions or code stored in a non-transitory computer-readable medium and executable by a controller or a processor to perform the functions or operations of the communication manager 1104 and/or the component. If implemented in code, the functions of the communication manager 1104 and/or a component may be executed by a controller/processor, a memory, a scheduler, a communication unit, or a combination thereof, of the BS 110 described above in connection with FIG. 2.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
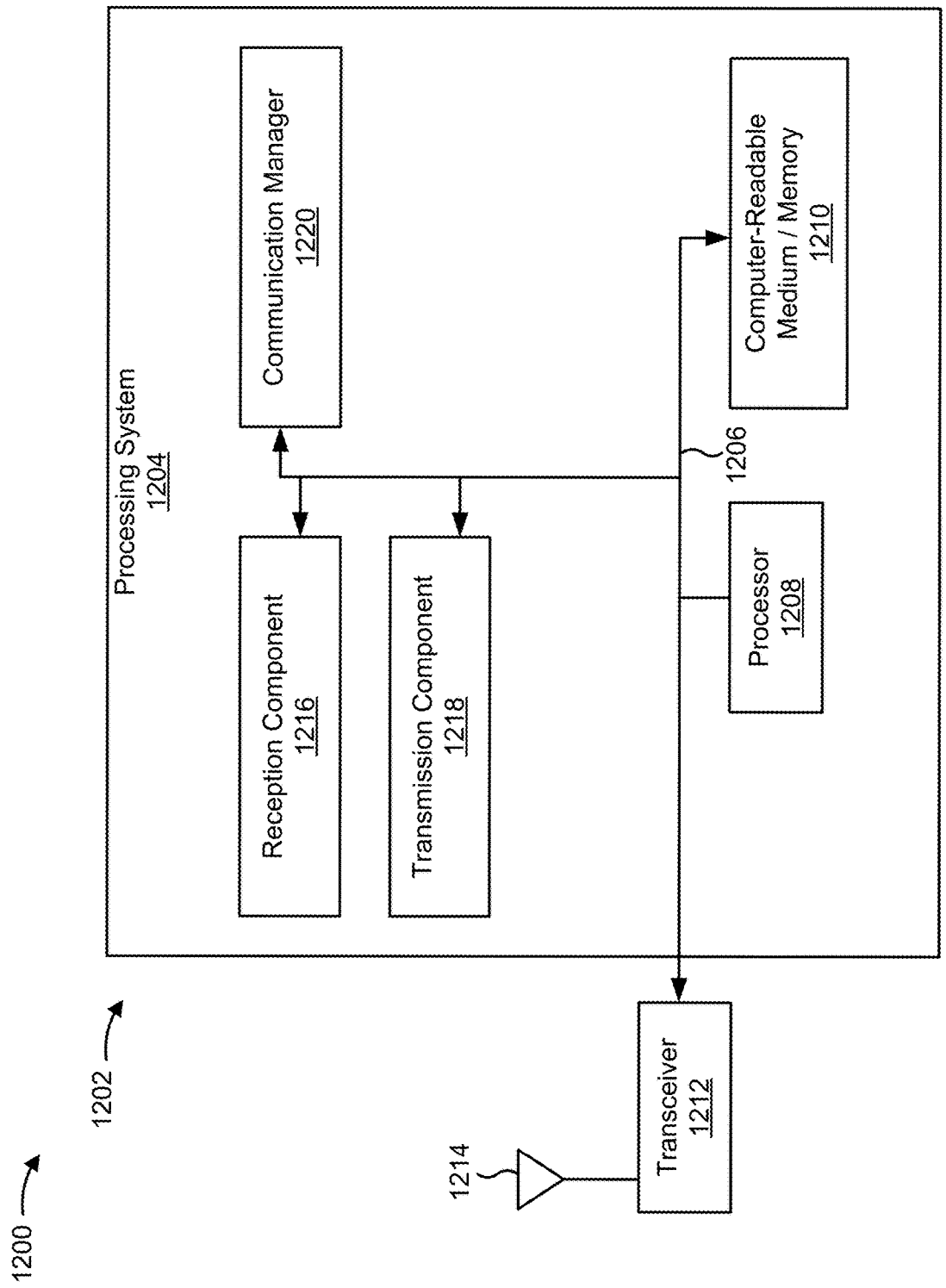

FIG. 12 is a diagram illustrating an example 1200 of a hardware implementation for an apparatus 1202 employing a processing system 1204. The apparatus 1202 may be, be similar to, include, or be included in the apparatus 1100 shown in FIG. 11.

The processing system 1204 may be implemented with a bus architecture, represented generally by the bus 1206. The bus 1206 may include any number of interconnecting buses and bridges depending on the specific application of the processing system 1204 and the overall design constraints. The bus 1206 links together various circuits including one or more processors and/or hardware components, represented by a processor 1208, the illustrated components, and the computer-readable medium/memory 1210. The bus 1206 may also link various other circuits, such as timing sources, peripherals, voltage regulators, and/or power management circuits, among other examples.

The processing system 1204 may be coupled to a transceiver 1212. The transceiver 1212 is coupled to one or more antennas 1214. The transceiver 1212 provides a means for communicating with various other apparatuses over a transmission medium. The transceiver 1212 receives a signal from the one or more antennas 1214, extracts information from the received signal, and provides the extracted information to the processing system 1204, specifically a reception component 1216. In addition, the transceiver 1212 receives information from the processing system 1204, specifically a transmission component 1218, and generates a signal to be applied to the one or more antennas 1214 based at least in part on the received information. The processing system 1204 may include a communication manager 1220 configured to manage one or more operations associated with communications described herein.

The processor 1208 is coupled to the computer-readable medium/memory 1210. The processor 1208 is responsible for general processing, including the execution of software stored on the computer-readable medium/memory 1210. The software, when executed by the processor 1208, causes the processing system 1204 to perform the various functions described herein in connection with a server. The computer-readable medium/memory 1210 may also be used for storing data that is manipulated by the processor 1208 when executing software. The processing system 1204 may include any number of additional components not illustrated in FIG. 12. The components illustrated and/or not illustrated may be software modules running in the processor 1208, resident/stored in the computer-readable medium/memory 1210, one or more hardware modules coupled to the processor 1208, or some combination thereof.

In some aspects, the processing system 1204 may be a component of the UE 120 and may include the memory 282 and/or at least one of the TX MIMO processor 266, the RX processor 258, and/or the controller/processor 280. In some aspects, the apparatus 1202 for wireless communication provides means for transmitting a neighbor cell list, a future cell list, and/or other system information, means for providing a cell, means for accommodating a UE cell selection procedure, and/or means accommodating a UE cell reselection procedure, among other examples. The aforementioned means may be one or more of the aforementioned components of the processing system 1204 of the apparatus 1202 configured to perform the functions recited by the aforementioned means. As described elsewhere herein, the processing system 1204 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 12 is provided as an example. Other examples may differ from what is described in connection with FIG. 12.

The following provides an overview of some Aspects of the present disclosure:

Aspect 1: A method of wireless communication performed by a user equipment (UE), comprising: receiving a neighbor cell list that indicates at least one neighbor cell; storing the neighbor cell list; performing a cell selection procedure or a cell reselection procedure; and switching to a serving cell without discarding the stored neighbor cell list.

Aspect 2: The method of Aspect 1, wherein the neighbor cell list comprises a plurality of cell selection parameters configured to facilitate the cell selection procedure or the cell reselection procedure.

Aspect 3: The method of Aspect 2, wherein the plurality of cell selection parameters comprises: a first set of cell selection parameters corresponding to at least one of a first frequency or a first cell identifier; and a second set of cell selection parameters corresponding to at least one of a second frequency or a second cell identifier.

Aspect 4: The method of either of Aspects 2 or 3, wherein the plurality of cell selection parameters are valid for a first geographical area.

Aspect 5: The method of Aspect 4, further comprising: performing a location update to indicate a location of the UE, wherein the location of the UE corresponds to a second geographical area; and acquiring an updated plurality of cell selection parameters that is valid for the second geographical area.

Aspect 6: The method of any of Aspects 2-5, further comprising: detecting at least one of a frequency or a cell identifier; and determining, based at least in part on the stored neighbor cell list, a set of cell selection parameters that corresponds to the at least one of the frequency or the cell identifier.

Aspect 7: The method of Aspect 6, further comprising performing an additional cell reselection procedure based at least in part on the set of cell selection parameters.

Aspect 8: The method of Aspect 2, further comprising: detecting a cell; determining that the stored neighbor cell list does not include a set of cell selection parameters corresponding to the cell; and acquiring an updated neighbor cell list based at least in part on determining that the neighbor cell list does not include the set of cell selection parameters corresponding to the cell.

Aspect 9: The method of any of Aspects 1-8, wherein the neighbor cell list comprises one or more cell reselection parameters associated with a potential future serving cell.

Aspect 10: The method of Aspect 9, wherein the one or more cell reselection parameters correspond to one or more neighbor cells of the potential future serving cell.

Aspect 11: The method of either of Aspects 9 or 10, wherein the one or more cell reselection parameters comprises at least one of: a set of intra-frequency cell reselection parameters, or a set of inter-frequency cell reselection parameters.

Aspect 12: The method of any of Aspects 1-11, further comprising receiving a future cell coverage list that indicates one or more future cells, wherein the one or more future cells include a cell that will cover a location of the UE at one or more future time instances.

Aspect 13: The method of Aspect 12, further comprising determining the one or more future time instances based at least in part on at least one of: an operating condition of the UE, device information corresponding to a non-terrestrial device that provides the future cell, or beam information corresponding to one or more beams provided by the non-terrestrial device.

Aspect 14: The method of either of Aspects 12 or 13, wherein the neighbor cell list corresponds to the future cell.

Aspect 15: The method of any of Aspects 12-14, wherein the serving cell comprises the future cell.

Aspect 16: The method of any of Aspects 12-15 wherein the future cell coverage list comprises at least one of: a cell identifier corresponding to the future cell, a carrier frequency corresponding to the future cell, or a cell reselection parameter corresponding to the future cell.

Aspect 17: The method of any of Aspects 12-16, wherein the future cell coverage list is valid for an associated validity time.

Aspect 18: The method of Aspect 17, further comprising refraining from acquiring an updated neighbor cell list based at least in part on the future cell coverage list being valid.

Aspect 19: The method of either of Aspects 17 or 18, further comprising: determining that the validity time is expired; and acquiring an updated future cell coverage list based at least in part on determining that the validity time is expired.

Aspect 20: The method of Aspect 19, wherein determining that the validity time is expired comprises detecting expiry of a validity time expiration timer.

Aspect 21: The method of Aspect 19, wherein determining that the validity time is expired comprises receiving an indication of expiration of the validity time.

Aspect 22: The method of any of Aspects 12-21, further comprising: determining that a mobility level of the UE satisfies an expiration condition corresponding to the future cell coverage list; and acquiring an updated future cell coverage list based at least in part on determining that the mobility level of the UE satisfies the expiration condition.

Aspect 23: The method of any of Aspects 12-22, wherein the serving cell comprises the future cell, and wherein the future cell coverage list indicates an additional future cell, the method further comprising: determining an occurrence of a cell reselection trigger; determining that the additional future cell fails to satisfy a cell reselection criterion; and performing an additional cell reselection procedure to switch to a neighbor cell of the serving cell.

Aspect 24: The method of Aspect 23, further comprising: determining that the UE does not have stored neighbor cell information associated with the neighbor cell of the serving cell; and acquiring system information comprising the neighbor cell information, based at least in part on determining that the UE does not have stored neighbor cell information.

Aspect 25: The method of Aspect 24, further comprising failing to detect a cell that is included on a future cell coverage list, wherein acquiring the system information comprising the neighbor cell information comprises acquiring the system information comprising the neighbor cell information based at least in part on failing to detect a cell that is included on a future cell coverage list.

Aspect 26: The method of any of Aspects 12-25, further comprising refraining from acquiring a neighbor cell list corresponding to the serving cell based at least in part on receiving the future cell coverage list.

Aspect 27: The method of any of Aspects 12-26, wherein the serving cell comprises the future cell, and wherein the future cell coverage list indicates an additional future cell, the method further comprising: determining an occurrence of a cell reselection trigger; determining that the additional future cell fails to satisfy a cell reselection criterion; detecting a cell that is included on an allowed cell list; and performing an additional cell reselection procedure to switch to the cell that is included on the allowed cell list.

Aspect 28: The method of any of Aspects 12-27, wherein the serving cell comprises the future cell, and wherein the future cell coverage list indicates an additional future cell, the method further comprising: determining an occurrence of a cell reselection trigger; determining that the additional future cell fails to satisfy a cell reselection criterion; failing to detect a cell that is included on a future cell coverage list; and performing an additional cell reselection procedure to switch to a neighbor cell of the serving cell.

Aspect 29: A method of wireless communication performed by a user equipment (UE), comprising: determining that a serving cell visibility duration of a serving cell satisfies a first threshold; determining that a new cell visibility duration of a new cell satisfies a second threshold; and performing a cell reselection procedure to switch from the serving cell to the new cell based at least in part on determining that the first threshold is satisfied and the second threshold is satisfied.

Aspect 30: The method of Aspect 29, wherein determining that the serving cell visibility duration satisfies the first threshold comprises determining that the serving cell visibility duration is less than the first threshold, wherein the first threshold is a value provided by a network device or a value selected by the UE.

Aspect 31: The method of either of Aspects 29 or 30, wherein determining that the new cell visibility duration satisfies the second threshold comprises determining that the new cell visibility duration is greater than the second threshold.

Aspect 32: The method of Aspect 31, wherein determining that the new cell visibility duration satisfies the second threshold comprises determining that the new cell visibility duration is greater than the first threshold.

Aspect 33: The method of any of Aspects 29-32, wherein the second threshold is greater than or equal to the first threshold.

Aspect 34: The method of any of Aspects 29-33, wherein the cell reselection procedure comprises an inter-frequency cell reselection procedure.

Aspect 35: The method of any of Aspects 29-33, wherein the cell reselection procedure comprises an inter-radio access technology cell reselection procedure.

Aspect 36: The method of any of Aspects 29-33, wherein the cell reselection procedure comprises a ranking-based cell reselection procedure.

Aspect 37: The method of any of Aspects 29-36, further comprising determining that the new cell satisfies a cell reselection criterion during a network defined reselection time interval.

Aspect 38: A method of wireless communication performed by a user equipment (UE), comprising: determining that a cell type of a candidate cell satisfies a reselection priority condition; and performing a cell reselection procedure to switch from a serving cell to the candidate cell based at least in part on determining that the cell type of the candidate cell satisfies the reselection priority condition.

Aspect 39: The method of Aspect 38, wherein the cell type of the candidate cell comprises at least one of: a terrestrial cell type, a non-terrestrial cell type, a low-earth orbit cell type, a mid-earth orbit cell type, or a geostationary earth orbit cell type.

Aspect 40: The method of either of Aspects 38 or 39, further comprising determining that a first frequency priority corresponding to the serving cell is the same as a second frequency priority corresponding to the candidate cell, wherein determining that the cell type of the candidate cell satisfies the reselection priority condition comprises determining that the cell type of the candidate cell satisfies the reselection priority condition based at least in part on determining that the first frequency priority is the same as the second frequency priority.

Aspect 41: The method of any of Aspects 38-40, further comprising determining that a first frequency corresponding to the serving cell is different than a second frequency corresponding to the candidate cell, wherein determining that the cell type of the candidate cell satisfies the reselection priority condition comprises determining that the cell type of the candidate cell satisfies the reselection priority condition based at least in part on determining that the first frequency is different than the second frequency.

Aspect 42: The method of any of Aspects 38-41, further comprising determining that frequency priority information corresponding to the candidate cell is not available, wherein determining that the cell type of the candidate cell satisfies the reselection priority condition comprises determining that the cell type of the candidate cell satisfies the reselection priority condition based at least in part on determining that the frequency priority information corresponding to the candidate cell is not available.

Aspect 43: The method of any of Aspects 38-42, wherein determining that the cell type of the candidate cell satisfies the reselection priority condition comprises determining that the cell type of the candidate cell is the same cell type as a cell type of the serving cell.

Aspect 44: The method of any of Aspects 38-43, further comprising receiving a broadcast message that indicates a bias parameter corresponding to the reselection priority condition.

Aspect 45: An apparatus for wireless communication at a device, comprising a processor; memory coupled with the processor; and instructions stored in the memory and executable by the processor to cause the apparatus to perform the method of one or more of Aspects 1-28.

Aspect 46: A device for wireless communication, comprising a memory and one or more processors coupled to the memory, the one or more processors configured to perform the method of one or more of Aspects 1-28.

Aspect 47: An apparatus for wireless communication, comprising at least one means for performing the method of one or more of Aspects 1-28.

Aspect 48: A non-transitory computer-readable medium storing code for wireless communication, the code comprising instructions executable by a processor to perform the method of one or more of Aspects 1-28.

Aspect 49: A non-transitory computer-readable medium storing a set of instructions for wireless communication, the set of instructions comprising one or more instructions that, when executed by one or more processors of a device, cause the device to perform the method of one or more of Aspects 1-28.

Aspect 50: An apparatus for wireless communication at a device, comprising a processor; memory coupled with the processor; and instructions stored in the memory and executable by the processor to cause the apparatus to perform the method of one or more of Aspects 29-37.

Aspect 51: A device for wireless communication, comprising a memory and one or more processors coupled to the memory, the one or more processors configured to perform the method of one or more of Aspects 29-37.

Aspect 52: An apparatus for wireless communication, comprising at least one means for performing the method of one or more of Aspects 29-37.

Aspect 53: A non-transitory computer-readable medium storing code for wireless communication, the code comprising instructions executable by a processor to perform the method of one or more of Aspects 29-37.

Aspect 54: A non-transitory computer-readable medium storing a set of instructions for wireless communication, the set of instructions comprising one or more instructions that, when executed by one or more processors of a device, cause the device to perform the method of one or more of Aspects 29-37.

Aspect 55: An apparatus for wireless communication at a device, comprising a processor; memory coupled with the processor; and instructions stored in the memory and executable by the processor to cause the apparatus to perform the method of one or more of Aspects 38-44.

Aspect 56: A device for wireless communication, comprising a memory and one or more processors coupled to the memory, the one or more processors configured to perform the method of one or more of Aspects 38-44.

Aspect 57: An apparatus for wireless communication, comprising at least one means for performing the method of one or more of Aspects 38-44.

Aspect 58: A non-transitory computer-readable medium storing code for wireless communication, the code comprising instructions executable by a processor to perform the method of one or more of Aspects 38-44.

Aspect 59: A non-transitory computer-readable medium storing a set of instructions for wireless communication, the set of instructions comprising one or more instructions that, when executed by one or more processors of a device, cause the device to perform the method of one or more of Aspects 38-44.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   receiving a future cell coverage list that indicates one or more future cells, wherein a future cell, of the one or more future cells, comprises a serving cell that will cover a location of the UE at one or more future time instances, wherein the one or more future time instances correspond to at least one of: an operating condition of the UE, or device information corresponding to a network device that provides the future cell, wherein the operating condition of the UE is based at least in part on a mobility level of the UE, and wherein the device information indicates a frequency priority or a cell type corresponding to the future cell;
   determining that a serving cell visibility duration of the serving cell is less than a first threshold;
   determining that a new cell visibility duration of a new cell is greater than a second threshold, wherein the second threshold is greater than or equal to the first threshold; and
   performing a cell reselection procedure to switch from the serving cell to the new cell based at least in part on determining that the first threshold is satisfied and the second threshold is satisfied.

2. The method of claim 1, wherein the first threshold is a value provided by a network device or a value selected by the UE.

3. The method of claim 2, wherein determining that the new cell visibility duration is greater than the second threshold comprises determining that the new cell visibility duration is greater than the first threshold.

4. The method of claim 2, further comprising determining that the new cell satisfies a cell reselection criterion during a network defined reselection time interval.

5. The method of claim 1, wherein the network device comprises a non-terrestrial device, the method further comprising determining the one or more future time instances based at least in part on beam information corresponding to one or more beams provided by the non-terrestrial device.

6. The method of claim 1, wherein the future cell coverage list is valid for an associated validity time.

7. The method of claim 1, wherein the future cell coverage list indicates an additional future cell, the method further comprising:
   determining an occurrence of a cell reselection trigger;
   determining that the additional future cell fails to satisfy a cell reselection criterion; and
   performing an additional cell reselection procedure to switch to a neighbor cell of the serving cell.

8. A user equipment (UE) for wireless communication, comprising:
   one or more memories; and
   one or more processors coupled to the one or more memories, the one or more processors configured to:
   receive a future cell coverage list that indicates one or more future cells, wherein a future cell, of the one or more future cells, comprises a serving cell that will cover a location of the UE at one or more future time instances, wherein the one or more future time instances correspond to at least one of: an operating condition of the UE, or device information corresponding to a network device that provides the future cell, wherein the operating condition of the UE is based at least in part on a mobility level of the UE, and wherein the device information indicates a frequency priority or a cell type corresponding to the future cell;
   determine that a serving cell visibility duration of the serving cell is less than a first threshold;
   determine that a new cell visibility duration of a new cell is greater than a second threshold, wherein the second threshold is greater than or equal to the first threshold; and
   perform a cell reselection procedure to switch from the serving cell to the new cell based at least in part on determining that the first threshold is satisfied and the second threshold is satisfied.

9. The UE of claim 8, wherein the first threshold is a value provided by a network device or a value selected by the UE.

10. The UE of claim 9, wherein to determine that the new cell visibility duration is greater than the second threshold, the one or more processors are configured to determine that the new cell visibility duration is greater than the first threshold.

11. The UE of claim 9, wherein the one or more processors are further configured to determine that the new cell satisfies a cell reselection criterion during a network defined reselection time interval.

12. The UE of claim 8, wherein the network device comprises a non-terrestrial device, the one or more processors further configured to determine the one or more future time instances based at least in part on beam information corresponding to one or more beams provided by the non-terrestrial device.

13. The UE of claim 8, wherein the future cell coverage list is valid for an associated validity time.

14. The UE of claim 8, wherein the future cell coverage list indicates an additional future cell, and wherein the one or more processors are further configured to:
   determine an occurrence of a cell reselection trigger;
   determine that the additional future cell fails to satisfy a cell reselection criterion; and
   perform an additional cell reselection procedure to switch to a neighbor cell of the serving cell.

15. An apparatus for wireless communication, comprising:
   means for receiving a future cell coverage list that indicates one or more future cells, wherein a future cell, of the one or more future cells, comprises a serving cell that will cover a location of the apparatus at one or more future time instances, wherein the one or more future time instances correspond to at least one of:
an operating condition of the apparatus, or device information corresponding to a network device that provides the future cell, wherein the operating condition of the apparatus is based at least in part on a mobility level of the apparatus, and wherein the device information indicates a frequency priority or a cell type corresponding to the future cell;
means for determining that a serving cell visibility duration of the serving cell is less than a first threshold;
means for determining that a new cell visibility duration of a new cell is greater than a second threshold, wherein the second threshold is greater than or equal to the first threshold; and
means for performing a cell reselection procedure to switch from the serving cell to the new cell based at least in part on determining that the first threshold is satisfied and the second threshold is satisfied.

16. The apparatus of claim 15, wherein the first threshold is a value provided by a network device or a value selected by the apparatus.

17. The apparatus of claim 16, wherein the means for determining that the new cell visibility duration is greater than the second threshold comprise means for determining that the new cell visibility duration is greater than the first threshold.

18. The apparatus of claim 16, further comprising means for determining that the new cell satisfies a cell reselection criterion during a network defined reselection time interval.

19. The apparatus of claim 15, wherein the network device comprises a non-terrestrial device, the apparatus further comprising:
means for determining the one or more future time instances based at least in part on beam information corresponding to one or more beams provided by the non-terrestrial device.

20. The apparatus of claim 15, wherein the future cell coverage list indicates an additional future cell, the apparatus further comprising:
means for determining an occurrence of a cell reselection trigger;
means for determining that the additional future cell fails to satisfy a cell reselection criterion; and
means for performing an additional cell reselection procedure to switch to a neighbor cell of the serving cell.

21. The apparatus of claim 15, wherein the future cell coverage list is valid for an associated validity time.

22. A non-transitory computer-readable medium storing a set of instructions for wireless communication, the set of instructions comprising:
one or more instructions that, when executed by one or more processors of a user equipment (UE), cause the UE to:
receive a future cell coverage list that indicates one or more future cells, wherein a future cell, of the one or more future cells, comprises a serving cell that will cover a location of the UE at one or more future time instances, wherein the one or more future time instances correspond to at least one of: an operating condition of the UE, or device information corresponding to a network device that provides the future cell, wherein the operating condition of the UE is based at least in part on a mobility level of the UE, and wherein the device information indicates a frequency priority or a cell type corresponding to the future cell;
determine that a serving cell visibility duration of the serving cell is less than a first threshold;
determine that a new cell visibility duration of a new cell is greater than a second threshold, wherein the second threshold is greater than or equal to the first threshold; and
perform a cell reselection procedure to switch from the serving cell to the new cell based at least in part on determining that the first threshold is satisfied and the second threshold is satisfied.

23. The non-transitory computer-readable medium of claim 22, wherein the first threshold is a value provided by a network device or a value selected by the UE.

24. The non-transitory computer-readable medium of claim 23, wherein to determine that the new cell visibility duration is greater than the second threshold, the one or more processors are configured to determine that the new cell visibility duration is greater than the first threshold.

25. The non-transitory computer-readable medium of claim 23, wherein the one or more processors are further configured to determine that the new cell satisfies a cell reselection criterion during a network defined reselection time interval.

26. The non-transitory computer-readable medium of claim 22, wherein the network device comprises a non-terrestrial device, and wherein the one or more processors are further configured to:
determine the one or more future time instances based at least in part on beam information corresponding to one or more beams provided by the non-terrestrial device.

27. The method of claim 1, further comprising:
receiving, from the network device, the new cell visibility duration, the new cell visibility duration corresponding to an amount of time remaining during which the new cell will be visible to the UE.

28. The non-transitory computer-readable medium of claim 22, wherein the one or more processors are further configured to:
receive, from the network device, the new cell visibility duration, the new cell visibility duration corresponding to an amount of time remaining during which the new cell will be visible to the UE.

29. The method of claim 1, further comprising selecting one or more values corresponding to at least one of: the new cell visibility duration, the first threshold, or the second threshold.

30. The method of claim 1, further comprising:
determining the mobility level corresponding to the UE; and
receiving an updated future cell coverage list according to the mobility level.

* * * * *